Patented Nov. 3, 1953

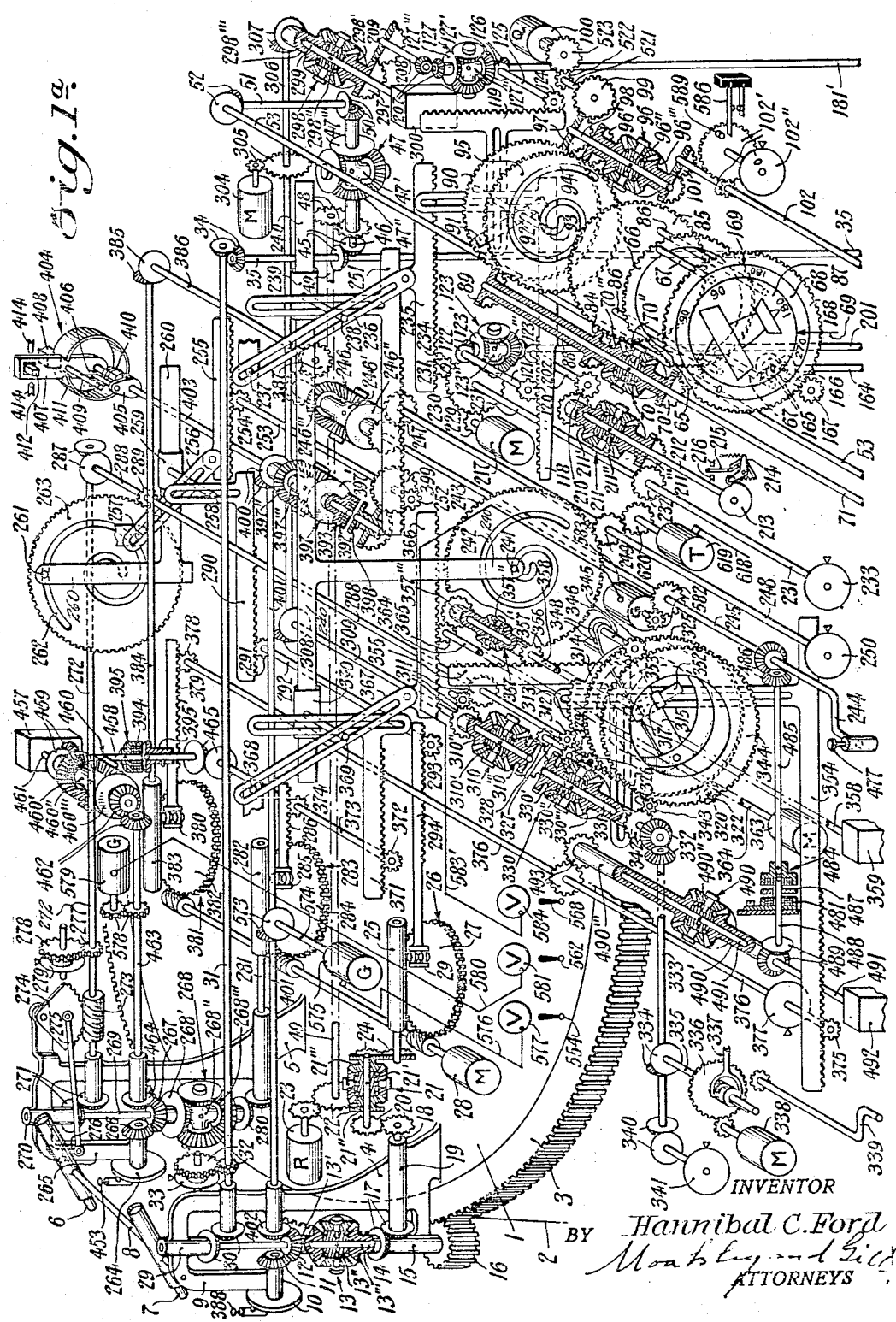

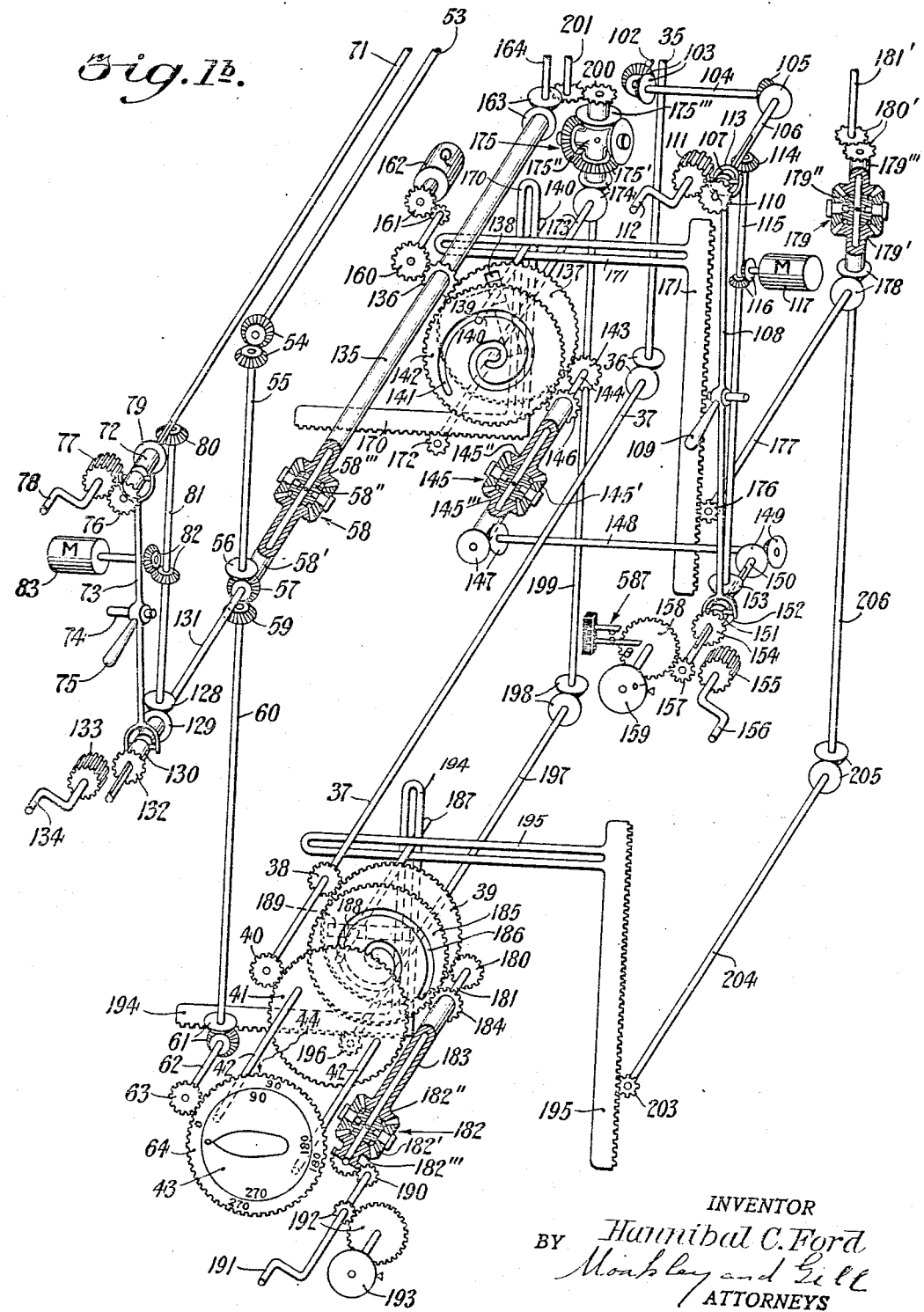

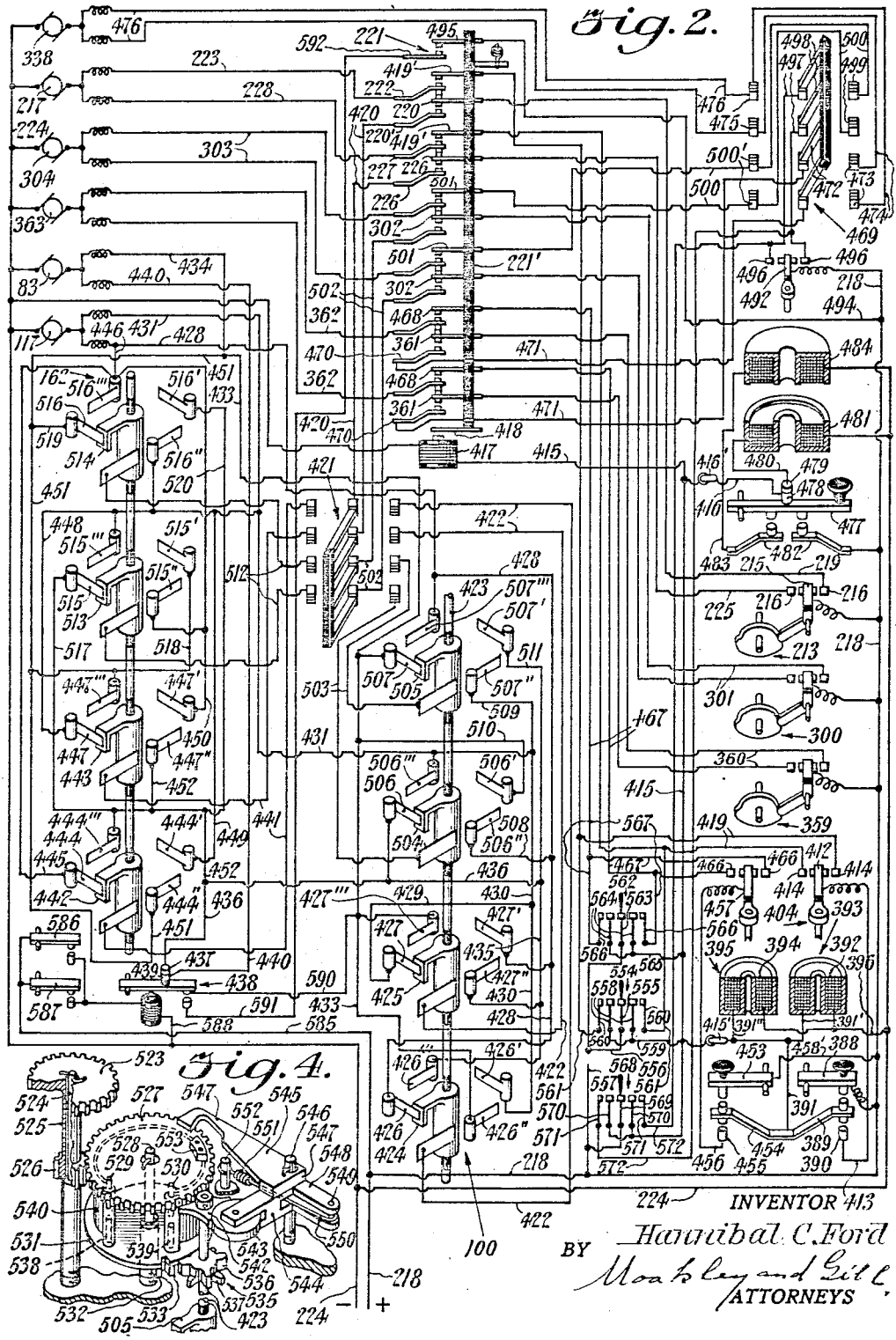

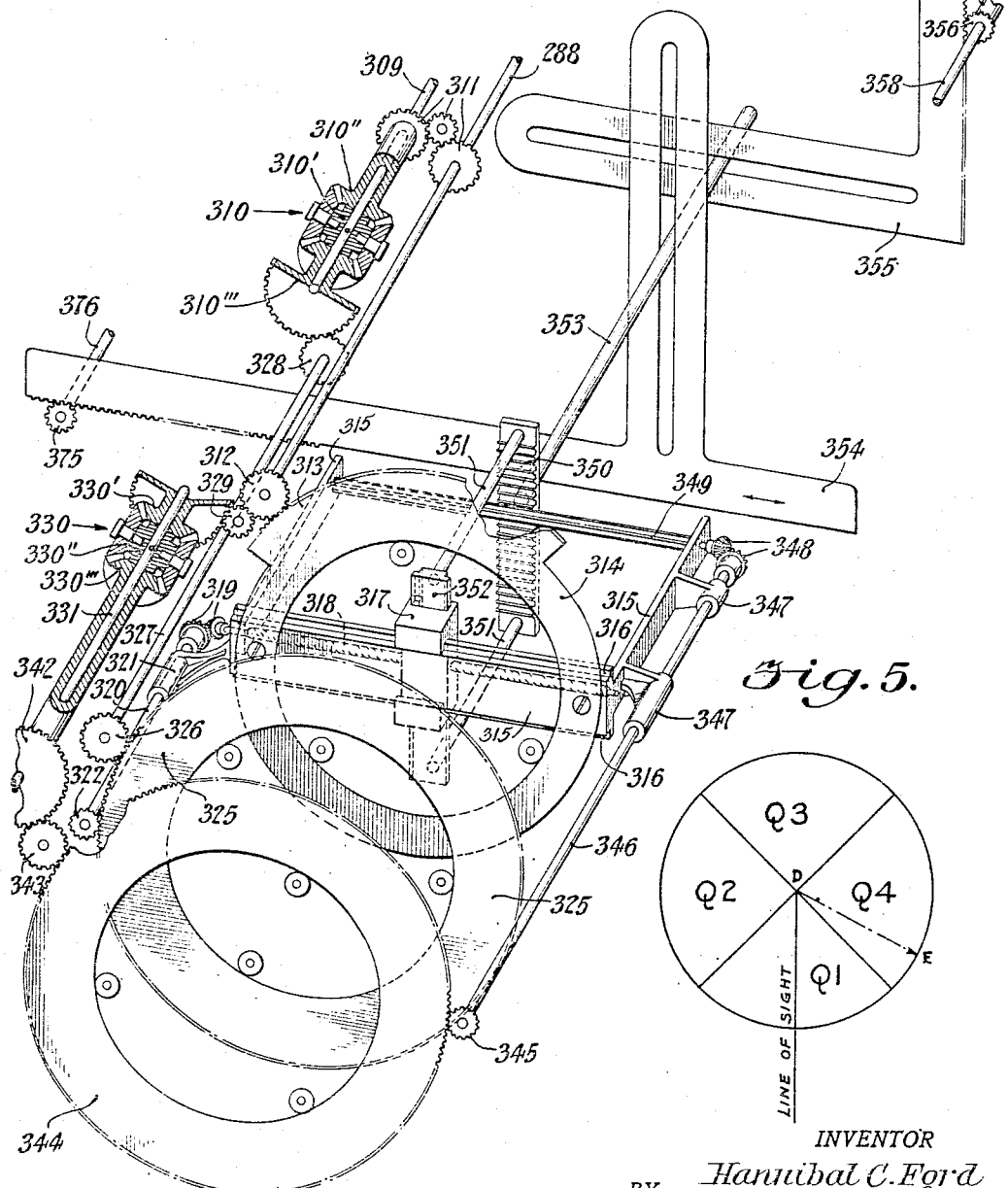

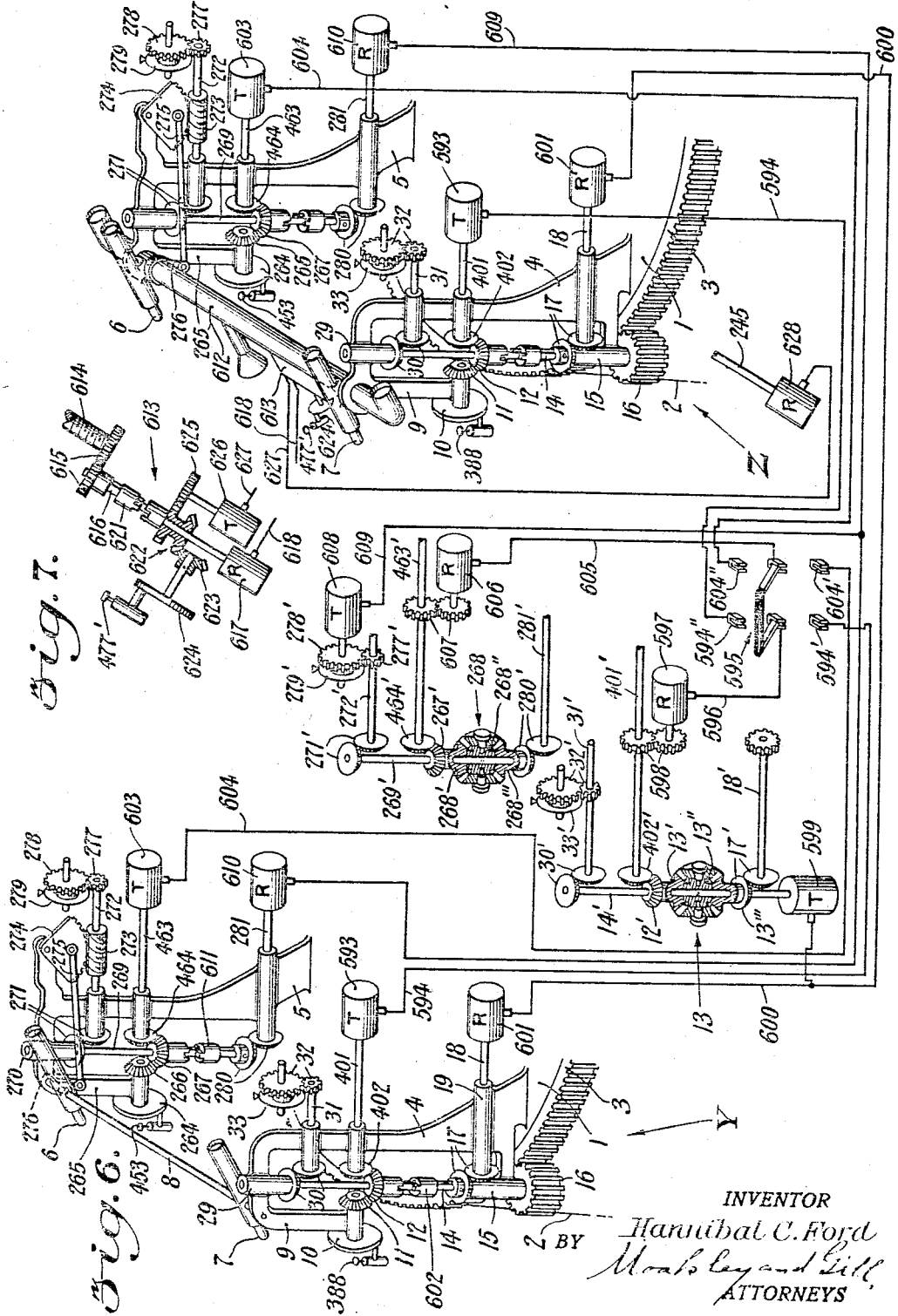

2,657,464

UNITED STATES PATENT OFFICE 2,657,464

FIRE CONTROL APPARATUS

Hannibal C. Ford, Jamaica, N. Y., assignor to The Sperry Corporation, a corporation of Delaware Application July 26, 1928, Serial No. 295,437

82 Claims. (Cl. 33—49)

This invention relates to apparatus for controlling the fire of ordnance and while especially intended for controlling ordnance used against aerial targets may be employed for ordnance used against surface targets.

It is an object of the invention to provide fire control apparatus for determining the course and speed of a target, and in the case of an aerial target its rate of climb, for use in predicting future positions of the target in order that the controlled guns may be properly aimed for their projectiles to hit the target.

It is a further object of the invention to provide an apparatus which when properly adjusted will automatically maintain the line of sight to a target in train and elevation and automatically maintain the range, thereby relieving the operators of the apparatus of the necessity of continuously performing the operation of following the target in train and elevation and putting in the range except insofar as they may be required to make adjustments from time to time to the automatically maintained values to correct for changes in the motion of the target.

While in its simplest form the invention is embodied in a single instrument having a sighting element and a computing mechanism in proximity and operatively related to each other, the invention also contemplates the physical separation of the element and the mechanism with suitable operating connections between them.

The invention further contemplates the automatic maintaining of the line of sight of another device, such as a similar standby instrument or a range finder, upon the same target as the controlling instrument in order that the standby instrument may be in condition to take control instantly or to insure that the range finder operator is observing the same target as the observer at the controlling instrument.

The particular nature of the invention as well as other objects and advantages thereof will appear most clearly from a description of preferred embodiments as shown in the accompanying drawings in which Figs. 1a and 1b constitute a diagrammatic perspective view of a form of instrument in which the sighting element and the computing mechanism are arranged in proximity, Fig. 2 is a wiring diagram of the instrument of Figs. 1a and 1b, Fig. 3 is an enlarged perspective view of certain elements of the computing mechanism to show them more clearly than does Fig. 1a, Fig. 4 is a similar view of a part of the switching mechanism of Fig. 2, Fig. 5 is a quadrant diagram, Fig. 6 is a diagrammatic view of a modified form of the invention adapted to be used with the computing mechanism of Figs. 1a and 1b most of which has been omitted for the sake of simplicity, and Fig. 7 shows on an enlarged scale a part of the range finder of Fig. 6.

Referring particularly to Figs. 1a and 1b it will be understood that all the parts while shown diagrammatically therein are in practice mounted upon a member 1 rotatably mounted upon a pedestal 2 within an annular rack 3 fixed to the top of the pedestal. Two standards 4 and 5 extend upwardly from the member 1 and between the tops of the standards are mounted two telescopes 6 and 7 for the pointer and trainer respectively, these telescopes being connected by a rod 8 so that they move together in elevation as well as in train. Mounted in a depending portion 9 of the standard 4 is a trainer's handwheel 10 provided with a bevel gear 11 which meshes with a bevel gear 12 connected to the side 13' of a differential 13. The center 13" of the differential is connected to a shaft 14 which extends through a bearing 15 forming part of the standard 4 and carries at its lower end a pinion 16 meshing with the training rack 3. The second side 13''' of the differential is connected by a pair of bevel gears 17 to a shaft 18 mounted in a bearing 19 on the standard 4. Through gears 20 the shaft is connected to the center 21' of a differential 21. One side 21" of the differential is connected through gears 22 to a repeater motor 23 actuated from a suitable direction indicating instrument, such as the gyro-compass of the ship on which the apparatus is mounted. The other side 21''' of the differential is connected through gears 24 to the roller 25 of a variable speed device 26 of the type shown in my Patent No. 1,317,915 of October 7, 1919. Briefly this device consists of a disc 27 driven at uniform speed by a motor 28 and a ball carriage 29 between the disc and the roller and adjustable from other elements of the mechanism as will be hereinafter described.

The shaft 14 to which the center of the differential 13 is connected extends upwardly into a bearing 29 at the top of the standard 4 where it is connected by a pair of bevel gears 30 to a shaft 31 which through gears 32 turns a dial 33 to give indications of target bearing referred to a fixed line, which, when the instrument is mounted on board ship, is usually the center line of the ship, since the shaft 31 is moved in accordance with the training movement of the instrument as the target is followed by the trainer who observes it through the telescope 7. This bearing will be hereinafter referred to as relative target bearing.

The shaft 31 is continued into the computing mechanism of the instrument where it is connected by a pair of bevel gears 34 to a shaft 35 which extends into the portion of the instrument shown in Fig. 1b. At its lower end the shaft is connected by bevel gears 36 to a shaft 37 which carries a pinion 38 engaging a gear 39 which is therefore turned in accordance with relative target bearing. The shaft 37 carries a second pinion 40 which engages a gear 41 also turnable in accordance with relative target bearing. The gear 41 is provided with posts 42 carrying an Own Ship dial 43 bearing a representation of a ship and readable against a pointer 44 to show the bearing of the target with respect to the fore and aft line of the ship.

Near its upper end, the shaft 35, see Fig. 1a, is connected by bevel gears 45 to a shaft 46 which is attached to the center 47' of a differential 47. One side 47" of the differential is connected by gears 48 to a shaft 49 which extends through the instrument to one of the gears 22 so that this shaft is driven in accordance with the course of the ship since it is rotated from the motor 23 actuated from the gyro compass of the ship.

The other side 47''' of the differential is connected by bevel gears 50 to a shaft 51 which is connected by bevel gears 52 to a shaft 53 which extends into the portion of the instrument shown in Fig. 1b where through bevel gears 54 it is connected to a shaft 55. The lower end of shaft 55 carries a bevel gear 56 meshing with a gear 57 attached to one side 58' of a differential 58, the remaining elements of which will be hereinafter described. The bevel gear 57 meshes with a gear 59 on a shaft 60 which through bevel gears 61 is connected to a shaft 62 carrying a pinion 63 which meshes with a ring 64 surrounding the Own Ship dial 43.

Since the shaft 35 and therefore the center 47' of differential 47, see Fig. 1a, are driven in accordance with the relative bearing of the target and the shaft 49 and therefore the side 47" of the differential are driven in accordance with the course of the ship, the other side 47''' will be turned in accordance with the algebraic sum of these two quantities which represents the true bearing of the target, that is the target bearing referred to the meridian. Through gears 50, shaft 51 and gears 52, the shaft 53 will be driven in accordance with the true bearing of the target and through gears 54, shaft 55, gears 56, 57 and 59, shaft 60, gears 61, shaft 62 and pinion 63 will turn the ring 64 so that its graduations read against the pointer 44 will show the true bearing of the target. Since the dial 43 is turned in accordance with the relative bearing of the target, the ring 64 when read against the zero mark of the dial 43 will show the course of the ship since the course is the algebraic difference between the true bearing of the target and its relative bearing. In other words, the mechanism just described indicates the relation of the fore and aft line of the ship to the meridian by elements movable in accordance with the true and relative bearings of the target.

The shaft 53 is provided at an intermediate point as shown in Fig. 1a with a pinion 65 which meshes with an annular gear 66 provided with a pair of posts 67 to the other ends of which is attached a ring 68 turnable in accordance with the true bearing of the target as is the ring 64 shown in Fig. 1b. In other words, these rings are correspondingly actuated from the shaft 53 in accordance with the true bearing of the target but the ring 68 reads against the pointer 69 displaced relatively to the ring through 180° from the pointer 44 against which the ring 64 is readable.

The pinion 65 also meshes with a pinion forming a part of one side 70' of a differential 70. The center 70'' of the differential is connected to a shaft 71 which extends into the portion of the instrument shown in Fig. 1b. Slidably mounted on the end of the shaft is a clutch 72 adapted to be operated by an arm 73 pivoted at 74 and provided with a handle 75. The clutch is provided with a pinion 76 adapted when in the position shown in Fig. 1b to engage a gear 77 to which is attached a handle 78 adapted to be operated in accordance with the estimated course of the target with respect to the meridian, which is the same reference line from which the true bearing of the target is measured. The clutch 72 also carries a bevel gear 79 adapted when the clutch is shifted inwardly along the shaft 71 to engage a bevel gear 80 on the end of a shaft 81 which by means of bevel gears 82 is connected to a target course motor 83 forming part of the automatic rate control feature of the instrument which will be described hereinafter.

Referring to Fig. 1a the second side 70''' of the differential 70 is provided with a pinion 84 which meshes with a gear 85 provided with posts 86 carrying a target dial 87 mounted within the ring 68 and carrying a representation of an aircraft target. The target dial reads against the pointer 69 to indicate the course of the target with respect to the line of sight or target angle as it will hereinafter be called for simplicity. The target dial also reads against the graduations of the ring 68 to indicate the course of the target with reference to the meridian, that is, the true course of the target.

Assuming that the shaft 71 is set by the crank 78 through pinions 77 and 76 and clutch 72 in accordance with the estimated course of the target, a corresponding setting of the center 70'' of the differential 70 will be made. Since as already described the side 70' of the differential is turned by the shaft 53 in accordance with the true bearing of the target and the center 70'' is turned in accordance with the estimated course of the target the resultant movement of the third side 70''' will be in accordance with the algebraic sum of these quantities, that is, the target angle. The movement of the side 70''' will be imparted to the gear 85 and the target dial 87 connected thereto so that the latter reads against its index or pointer 69 and will give the target angle.

The side 70''' of differential 70 is provided with an extension 88 having a gear 89 meshing with a gear 90 which will therefore be turned in accordance with the target angle as are gear 85 and target dial 87. Gear 90 is provided with a slot 91 within which is mounted a slidable block 92 carrying a rod 93, the forward end of which extends into a spiral groove 94 in a target speed gear 95.

The target speed gear 95 meshes with a gear forming part of the side 96' of a differential 96. The target angle gear 90 meshes with a gear 97 on a shaft 98 attached to the center 96'' of the differential 96. The gear 97 drives through a gear 99, a quadrant switch 100 which will be described in detail hereinafter. The other side 96''' of the differential is provided with a gear which meshes with a gear 101 on a shaft 102 which extends into the part of the instrument shown in Fig. 1b where through bevel gears 103, shaft 104 and bevel gears 105, it drives shaft 106. Slidably mounted on the end of the last named shaft is a clutch 107 like the one previously described and designated 72. The clutch 107 is shifted on the shaft 106 by an arm 108 provided with an operating handle 109. The clutch carries a pinion 110 adapted when in the position shown in Fig. 1b to engage a gear 111 to which is attached a handle 112 adapted to be operated in accordance with the estimated air speed of the target. The clutch also carries a bevel gear 113 adapted when the clutch is shifted inwardly along the shaft 106 to engage a bevel gear 114 on the end of a shaft 115 which by means of bevel gears 116 is connected to a target speed motor 117 forming part of the automatic rate control feature of the instrument. As shown in Fig. 1a the shaft 102 drives through gears 102' a dial 102'' for showing the air speed of the target put into the instrument.

In the operation of the parts described just above and regarding the shaft 102 as fixed, the side 96''' of differential 96 will also be fixed since it is connected to the shaft 102. Therefore the movement imparted to the target angle gear 90 by the differential 79 will through gear 97, shaft 98, center 96'' and side 96' of the differential 96 turn the target speed gear 95 in unison with the target angle gear 90.

When, however, shaft 102 is turned in accordance with the estimated air speed of the target from the handle 112 through gear 111, pinion 110, clutch 107, shaft 106, gears 105, shaft 104 and gears 103, the gear 101 will turn the side 96''' of the differential. Regarding the center 96'' as fixed since it is connected to the target angle gear 90, side 96' will be turned to shift the position of the target speed gear 95 with respect to the target angle gear. As the target speed gear turns, the rod 93 which fits into the groove 94 will be shifted to alter the position of the block 92 in the slot 91 of the target angle gear 90.

The pin 93 extends on the other side of the block 92 into intersecting slots of a pair of rectangular slides 118 and 119, the positions of which are determined by the position of the pin 93 which in turn is determined by the positions of the target angle gear 90 and the target speed gear 95. The arrangement is such that the horizontally movable slide 118 is positioned in accordance with the horizontal lateral deflection of the target due to its own movement, that is, the horizontal component of the air speed of the target perpendicular to the line of sight. This component is equal to the product of horizontal range of the target $R_H$ and the rate of change of bearing $dB_T$, or $R_H dB_T$ due to the target.

The vertical movable slide 119 is positioned in accordance with the rate of change of the horizontal range of the target due to its air speed, or more briefly, the horizontal range rate of the target, designated $dR_H$.

The slide 118 is provided with a rack which meshes with a pinion 120 on a shaft 121 which through bevel gears 122 is connected to one side 123' of a differential 123, the remaining elements of which will be hereinafter described.

In a similar manner the slide 119 is provided with a rack which meshes with a pinion 124 on a shaft 125 which through bevel gears 126 is connected to the side 127' of a differential 127, the remaining elements of which will also be hereinafter described.

Referring to the left hand portion of Fig. 1b, the shaft 81 carries at its lower end a bevel gear 128 which meshes with a corresponding gear 129 on a clutch 130, similar to clutches 72 and 107, slidably mounted on the end of a shaft 131 and adapted to be shifted by the arm 73 and operating handle 75. The clutch carries a pinion 132 adapted to engage a gear 133 provided with a handle 134 adapted to be operated in accordance with the estimated direction of the wind. The purpose of connecting the clutches 72 and 130 to the arm 73 as shown in Fig. 1b is to prevent the motor 83 from simultaneously driving both shafts 71 and 131 as will appear more clearly in connection with the description of the rate control features of the invention. The gears 77 and 133 are elongated so that when the arm 73 occupies a position parallel to shaft 81 the pinions 76 and 132 will be in engagement with their corresponding gears so that target course and wind direction may be simultaneously put into the instrument by manipulation of handles 78 and 134 respectively. When the arm 73 occupies the position shown, target course may be put into the instrument by turning handle 78, but the shaft 131 is disconnected from the wind direction handle 134 and connected to the motor 83 through the clutch 130, gears 129 and 128 and shaft 81. Similarly, when the arm 73 is shifted to bring the gears 79 and 80 into engagement, the shaft 71 is disconnected from the target course handle 78 and connected to the motor 83, while the shaft 131 is connected to the wind direction handle 134 through the clutch 130.

The shaft 131 is connected to the center 58'' of differential 58. The other side 58''' of this differential is provided with an extension 135 carrying a pinion 136 meshing with a wind angle gear 137 provided with a slot 138 within which is mounted a slidable block 139 provided with a rod 140, the forward end of which extends into a groove 141 in a wind velocity gear 142. The wind angle gear 137 meshes with a gear 143 on a shaft 144 attached to the center 145' of a differential 145. One side 145'' of the differential carries a pinion 146 meshing with the wind velocity gear 142. The other side 145''' of the differential is connected through bevel gears 147 to a shaft 148 which through bevel gears 149 is connected to a shaft 150 on which is slidably mounted a clutch 151 similar to the clutches previously described. This clutch is shiftable upon the shaft 150 by the arm 108 and handle 109. It carries a bevel gear 152 adapted to engage a corresponding gear 153 on the lower end of shaft 115 to which the motor 117 is connected through gears 116, the arrangement being such that the motor cannot be simultaneously connected to shafts 106 and 150 through clutches 107 and 151 respectively. In other words, this arrangement is like that previously described in connection with target course and wind direction.

Clutch 151 is provided with a pinion 154 adapted when the clutch is in its forward position to mesh with a gear 155 having a handle 156 adapted to be operated in accordance with wind velocity. At the outer end of shaft 150 is a pinion 157 meshing with a gear 158 to which is connected a wind velocity dial 159.

The pinion 136 on the extension 135 of the side 58''' of differential 58 engages a gear 160 which through a shaft and gear train 161 drives a wind quadrant switch 162 which like the quadrant switch 100 will be hereinafter described in detail. The outer end of the extension 135 is connected by bevel gears 163 to a shaft 164 which extends into a portion of the instrument shown in Fig. 1a where through bevel gears 165, shaft 166 and pinion 167 it drives an annular gear 168 surrounding the ring 68 and provided with an index 169 readable against the graduations of the ring 68 to show the direction from which the wind is blowing referred to the meridian.

Referring to Fig. 1b and assuming that the clutch 130 has been shifted to mesh the pinion 132 with the gear 133 and that the handle 134 is turned in accordance with wind direction, the shaft 131 and therefore the center 58'' of the differential 58 will be correspondingly turned. Since the side 58' of the differential is driven from shaft 55 in accordance with the true bearing of the target the other side 58''' will be driven in accordance with the direction of the wind referred to the line of sight, or wind angle as it will be called hereinafter. The movement of the side 58''' will be imparted through pinion 136 to the wind angle gear 137 and the wind quadrant switch 162. The wind angle gear ring 168 of Fig. 1a will also be driven through bevel gears 163, shaft 164 bevel gears 165, shaft 166 and pinion 167. The index 169 of the wind ring will when read against the true bearing ring 68 show the direction of the wind as set into the instrument by manipulation of handle. The rotation of wind angle gear 137 will through pinion 143 and shaft 144 drive the center 145' of differential 145 and regarding the side 145''' as fixed at this time, the other side 145'' will be driven to turn through pinion 146, the wind velocity gear 142 in unison with the wind angle gear 137. When, however, the shaft 148 is turned in accordance with the estimated wind velocity from the handle 156, assuming the clutch 151 has been shifted to bring its pinion 154 into engagement with the gear 155, the side 145''' of the differential will be turned and regarding the center 145' as fixed, the other side 145'' will be turned to shift the wind velocity gear 142 with respect to the wind angle gear 137. Due to the angular movement of gear 137 the slot 138 will be positioned in accordance with the direction of the wind while the block 139 and pin 140 will be shifted by the relative movement of the wind velocity gear 142 with respect to the wind angle gear 137 to position the pin 140 in accordance with the velocity of the wind and its angle with respect to the line of sight.

The pin 140 is extended through intersecting slots of a pair of rectangular slides 170 and 171, the former of which is moved in accordance with the deflection of the target due to the effect of the wind upon it, that is, in accordance with the quantity $R_HdB_W$, where $R_H$ is the horizontal range and $dB_W$ the rate of change of bearing due to wind. The slide 171 is moved in accordance with the rate of change of the horizontal range of the target due to the effect of the wind, that is in accordance with the quantity $dR_W$. The slide 170 is provided with a rack portion engaging a pinion 172 on a shaft 173 connected through bevel gears 174 to one side 175' of a differential 175, the remaining elements of which will presently be described. Similarly the slide 171 is provided with a rack portion engaging a pinion 176 on a shaft 177 connected by bevel gears 178 to one side 179' of a differential 179, the remaining elements of which will also presently be described.

Reference has previously been made to the gear 39, see Fig. 1b, which is turned in accordance with relative target bearing from the training element of the instrument. This gear meshes with a pinion 180 on a shaft 181 which is connected to the center 182' of a differential 182. One side 182'' of this differential is provided with an extension 183 which by means of a pinion 184 is connected to an Own Ship speed gear 185 provided with a groove 186 within which is fitted one end of a pin 187 passing through a block 188 slidably mounted in a slot 189 in the gear 39. The other side 182''' of the differential 182 is provided with a gear meshing with a pinion 190 on a shaft having a handle 191 and connected through gears 192 to a dial 193 for indicating the speed of Own Ship when this quantity is put into the instrument by operation of the handle.

As in the case of the wind direction and velocity gears hereinbefore described the Own Ship speed gear 185 will be turned in unison with the gear 39 through the differential 182 when the side 182''' is fixed, as it will be due to its connections to the handle 191. When, however, the handle is turned in accordance with the speed of the ship the gear 185 will be shifted with respect to gear 39 to position pin 187 in accordance with the speed of the ship. The movement of gear 39 will position the pin in accordance with the relative target bearing.

The pin 187 passes through the intersecting slots of a pair of rectangular slides 194 and 195 the former of which is moved in accordance with the deflection due to the movement of Own Ship, that is $R_HdB_O$, while the latter is moved in accordance with the rate of change in range due to the component movement of the ship toward or away from the target, that is $dR_O$. The slide 194 is provided with a rack portion engaging a pinion 196 on a shaft 197 which through bevel gears 198 is connected to a shaft 199 attached to the center 175'' of differential 175. Since as previously explained the side 175' is turned in accordance with the deflection due to the wind, the movement imparted to the other side 175''' will be the algebraic sum of the deflection due to the wind and the deflection due to the movement of Own Ship. The resultant movement of the side 175''' will be transmitted through gears 200 and shaft 201 to the center 123'' of the differential 123. Since as previously described the side 123' of this differential is driven from the slide 118 in accordance with the horizontal lateral deflection of the target, the third side 123''' will be driven in accordance with the algebraic sum of this quantity and the sum of the deflection due to wind and Own Ship. A shaft 202 is connected by bevel gears to the side 123''' of the differential and thus receives a movement in accordance with the resultant horizontal lateral deflection which will be designated $R_HdB$.

Referring to Fig. 1b the vertical movable slide 195 is provided with a rack portion engaging a pinion 203 on a shaft 204 connected by bevel gears 205 to a shaft 206 attached to the center 179'' of the differential 179. Since the side 179' of this differential is moved from the slide 171 in accordance with the rate of change of range due to the wind, the other side 179''' will be moved in accordance with the algebraic sum of this quantity and the rate of change of range due to the movement of Own Ship. The resultant movement of the side 179''' will be transmitted by gears 180' and shaft 181' to the center 127' of the differential 127 shown in Fig. 1a. Since the side 127' of this differential is driven from the slide 119 in accordance with the horizontal range rate due to the target, the third side 127''' will be driven in accordance with the algebraic sum of these quantities and the resultant horizontal range rate due to wind and movement of Own Ship and target, that is, in accordance with $dR_H$. The resultant movement of the third side 127''' will be transmitted through bevel gears 207 and shaft 208 to a gear 209 connected to a differential which will be hereinafter described.

The shaft 202 is provided with a pinion 210 which meshes with a gear forming part of one side 211' of a differential 211. The center 211'' of the differential is attached to a shaft 212 carrying at its outer end a cam disc 213 for actuating a contact device 214 to shift an arm 215 into engagement with one or the other of a pair of contacts 216 which as shown most clearly in the wiring diagram of Fig. 2 control the operation of a motor 217 as follows. The contact arm 215 is electrically connected to one main 218 of a source of current supply. One of the contacts 216 is connected by a conductor 219 to a contact element 220 of a control switch 221 consisting of a bar 221' of insulation and carrying a number of contact elements. From the contact element 220 the circuit continues through another contact 222 and conductor 223 to one field winding of the motor 217 and thence through the armature to the other main 224 of the source of current supply. The other contact 216 is connected by a conductor 225 to a contact 226 of the control switch 221 and continues through contact 227, conductor 228 and a field winding of the motor 217 wound reversely to the other winding and thence through the armature to the main 224.

The direction of rotation of the motor 217 is therefore determined by the direction of rotation imparted to the cam 213 from the shaft 202 and pinion 210 through the side 211' and center 211'' of differential 211. Through a pinion 229 the motor drives a gear 230 on a shaft 231 which also carries a pinion 232 meshing with a pinion forming part of the second side 211''' of the differential 211. This arrangement is such that as the motor 217 drives the shaft 231 the center 211'' of the differential will be driven from the side 211''' in a direction, opposite to which it was driven from the side 211' by the shaft 202 and pinion 210, to actuate the cam disc 213 to break the circuit of motor 217. These operations occur successively with the result that the shaft 231 is driven in accordance with the movement of the shaft 202 and pinion 210 but with increased power due to the interposition of the motor 217, or in other words, the mechanism constitutes a follow-up system for driving the shaft 231. At its lower end the shaft 231 carries a dial 233 which indicates the quantity $R_H dB$ or its equivalent $R dB_N$.

While the relative knots component of the target across the line of sight is the same in the inclined plane as it is in the horizontal plane the direct range R is different in the inclined plane from the horizontal range $R_H$ to a point directly under the target. Therefore the angular rate in the inclined plane expressed as $dB_N$ differs from the angular rate in the horizontal plane expressed as $dB$. Inasmuch as the relative knots component of the target is proportional to angular rate multiplied by the range the knots component in an inclined plane equals $R dB_N$ and the knots component of the target in a horizontal plane equals $R_H dB$. Inasmuch as these knots components are equal to $R dB_N$ equals $R_H dB$.

The other end of shaft 231 carries a pinion 234 which meshes with the rack portion of a slide 235 which will therefore be moved horizontally in accordance with the quantity $R dB_N$. A slotted bar 236 is attached at its lower end to the slide 235 and at its upper end is supported by a fixed pin 237. Fitting within the bar 236 is a pin 238 projecting from a member 239 slidably mounted on the horizontal arm of a T-shaped member 240 having at the lower end of its vertical arm a pin 241 which fits within a groove 242 in gear 243 adapted to be turned in accordance with the range of the target through the following connections. A crank 244 adapted to be turned by an operator known as a range setter is provided on one end of a shaft 245, the other end of which is connected to the center 246' of a differential 246. One side 246'' of this differential is provided with a gear which meshes with a gear 247 on a shaft 248 carrying a pinion 249 meshing with the range gear 243 and also carrying a range dial 250. Considering at present the third side 246''' of the differential 246 as being fixed, the movement imparted to the shaft 245 by the crank 244 will through the center 246', the side 246'' and the gear 247 drive the shaft 248 and consequently the gear 243 in accordance with the direct range of the target. The cam groove 242 on this gear is formed in accordance with the reciprocals of the range values so that the vertical movement imparted to the member 240 is in accordance with $$\frac{1}{R}$$

Therefore the pin 238 will be adjusted vertically in accordance with $$\frac{1}{R}$$

and horizontally by the movement of the slide 235 in accordance with $R dB_N$ thus multiplying these quantities and giving $dB_N$.

The pin 238 also passes through the slotted vertical arm of a slide 251, the horizontal arm of which will therefore be moved in accordance with $dB_N$. A portion of this slide is provided with a rack which meshes with a pinion 252 on a shaft 253 to the other end of which is attached a pinion 254 meshing with a rack on slide 255 which will therefore be moved in accordance with $dB_N$.

If the instrument is being employed for controlling the firing of guns against aerial targets, the quantities thus far dealt with will be referred to a line of sight which is elevated with respect to the horizontal at an angle designated A. The sighting instrument, however, is mounted to train in a horizontal plane so that in order to compute the training movement required to maintain it on the target it is necessary to refer the quantity $dB_N$ to a horizontal plane. This may be done by dividing it by the cosine of the angle A or multiplying it by the secant of this angle. In the instrument disclosed herein the latter method is employed.

For this purpose there is pivoted to the slide 255 a slotted bar 256, the other end of which is retained by a fixed pin 257. A rod 258 passes through the bar 256 and is attached to a member 259 slidably mounted on a rectangular slide 260.

At the upper end of the vertical arm of this slide is a pin 261 which extends into a groove 262 in a gear 263, the groove being arranged to impart to the pin 261 and slide 260 a vertical movement in accordance with the secant of the angle A when the gear 263 is turned in accordance with this angle.

In order that the gear may be thus turned a pointer's handwheel 264 is mounted in a depending portion 265 of the standard 5 and carries a bevel gear 266 which meshes with a bevel gear 267 forming part of one side 268' of a differential 268, the center 268" of which is attached to a shaft 269 extending into a bearing 270 at the top of the standard 5 where by means of a pair of bevel gears 271 it is connected to a shaft 272 extending into the computing mechanism of the instrument. The shaft carries a worm 273 which engages a gear sector 274 mounted on the standard 5 and connected by a link 275 to an arm 276 attached to the rod 8 connected between the telescopes 6 and 7. By virtue of this arrangement the telescopes are adjusted vertically by the pointer who observes the target through his telescope 6 while turning his handwheel 264. The shaft 272 is provided with a pinion 277 meshing with a gear 278 for turning a dial 279 to show the values of the angle A.

At this point it will be explained that the second side 268''' of differential 268 is connected by a pair of bevel gears 280 to a shaft 281 connected to the roller 282 of a variable speed device 283 similar to device 26 and consisting of a disc 284 driven at constant speed by the motor 28. Between the disc and roller is a ball carriage 285 adapted to be set by a rack 286 in accordance with the rate of change of elevation angle, $dA$, as will hereinafter appear.

The end of shaft 272 within the computing mechanism is connected by a pair of bevel gears 287 to a shaft 288 which carries a pinion 289 meshing with the secant gear 263 whereby the latter is turned in accordance with the angle A to correspondingly position the slide 260 and the pin 258 vertically. The pin is also positioned horizontally by the slide 255 and arm 256 so that its resultant position represents the product of $dB_N$ and secant A to give the rate of change of bearing referred to a horizontal plane, which will be designated $dB$.

The forward end of pin 258 extends into the slotted vertical arm of a horizontal slide 290 which is therefore moved in accordance with the quantity $dB$ and through a pinion 291, a shaft 292 and a pinion 293 moves a rack 294 connected to the ball carriage 29 of the variable speed device 26 to position the latter in accordance with the quantity $dB$. The position of the ball carriage relatively to the center of the constant speed disc 27 determines the speed at which the roller 25 will be driven. The side 21''' of differential 21 will be driven through the gears 24 from the roller 25. Regarding the other side 21'' as fixed the center 21' will be driven and through gears 20 the shaft 18 will be driven to drive the side 13''' of the differential 13. Regarding the trainer's handwheel 10 as fixed the side 13' of the differential will also be fixed so that its center 13'' will be rotated and through the shaft 14 will turn the pinion 16 relatively to the fixed rack 3 to cause the instrument to be automatically trained in accordance with the established rate of change of bearing in the horizontal plane.

As previously explained the gear 209 is rotated from the differential 127 in accordance with the horizontal range rate of the target, that is, in accordance with $dR_H$. This movement of the gear is transmitted through a pinion 297 attached to one side 298' of a differential 298, the center 298'' of which is attached to a shaft 299 which controls a cam and contact elements like those previously described and designated 213, 214, 215 and 216, but which for the sake of simplicity will be designated generally 300, which number is also applied to the wiring diagram of Fig. 2 wherein elements similar to those previously described for controlling the motor 217 are illustrated. In this case the circuit is established by the device 300 from the main 218 over one or the other of a pair of conductors 301, contact elements 302 of the control switch 221 and conductors 303 to the reversely wound field windings of a motor 304 and thence through the armature to the other main 224. As shown in Fig. 1a the motor 304 drives through a pair of gears 305, a shaft 306 connected at one end through bevel gears 307 to the side 298''' of the differential 298. The differential 298, contact device 300 and motor 304 constitute a follow-up system for the quantity $dR_H$ similar to that previously described in connection with the quantity $R_H dB$ and imparts to the shaft 306 a movement in accordance with the quantity $dR_H$.

Through a pair of bevel gears 308 the movement of the shaft is transmitted to a shaft 309 connected to the center 310' of a differential 310 shown on an enlarged scale in Fig. 3 with other parts of the mechanism about to be described. One side 310'' of the differential is connected through a gear train 311 to the shaft 288 which as previously described is turned in accordance with the angle A representing the elevation angle of the target. The shaft 288 carries at its end a gear 312 meshing with the segmental gear portion 313 of a ring 314 to which is attached a U-shaped frame 315 having a pair of guideways 316 on which is slidably mounted a block 317 adapted to be positioned by a screw 318 mounted in the frame and actuated through a pair of bevel gears 319 from a shaft 320 supported in a bracket 321 attached to the frame 315. The shaft 320 carries a pinion 322 which meshes with an annular gear 325. The gear 325 is connected through a pinion 326, shaft 327 and pinion 328 to the second side 310''' of the differential 310.

The gear 312 on the shaft 288 is connected through an idler 329 to one side 330' of a differential 330. The center 330'' of this differential is attached to a shaft 331 which as shown in Fig. 1a is connected through a pair of bevel gears 332, shaft 333, bevel gears 334, shaft 335, to a gear 336 which may be shifted by a suitable device 337 into operative relation to a motor 338 or a crank 339. The crank 339 is adapted to be set in accordance with the rate of climb of the target, this quantity being designated $dC$, and the motor forms part of the rate control mechanism of the instrument for this quantity. The shaft 333 is also connected through the bevel gears 340 to a dial 341 for indicating the rate of climb.

As shown most clearly in Fig. 3 the third side 330''' of the differential 330 is extended and carries a gear 342 which through an idler 343 drives an annular gear 344 similar to gear 325. The gear 344 drives through a pinion 345, a shaft 346 mounted in brackets 347 attached to one arm of the frame 315. Through bevel gears 348 the shaft 346 drives a pinion shaft 349 mounted between the outer ends of the arms of the frame 315. The pinion shaft engages a rack 350 carried upon a pair of rods 351 extending from a member 352 slidably mounted in the block 317 for movement in direction at right angles to the direction of movement of the block on the frame 315. Attached to the rack 350 is a rod 353 passing through the slotted vertical arm of a horizontally movable slide 354 and the slotted horizontal arm of a vertically movable slide 355.

In the operation of the elements of the instrument that have just been described the rotation of the shaft 288 in accordance with the elevation angle of a target will through the pinion 312, gear sector 313 and ring 314 position the frame 315 in accordance with the angle A, as shown in Fig. 1a as distinguished from Fig. 3 in which the frame is shown in its horizontal position as it would be for a surface target in which case the angle A equals zero. At the same time the shaft 288 will through gear train 311 drive the side 310″ of the differential 310 and regarding its center as fixed the side 310‴ will through gear 328, shaft 327 and gear 326, drive the annular gear 325 in unison with the ring 314. The shaft 288 will also through pinion 312 and idler 329 drive the side 330′ of the differential 330 and regarding the center 330″ as fixed the side 330‴ will be turned and through the gears 342 and 343 drive the annular gear 344, so that under these conditions the ring 314 and the annular gear 325 and 344 will be rotated in unison and the frame 315 will be positioned in accordance with the elevation angle of the target, no movement being imparted to the block 317 or the rack 350 relative to the ring 314. In other words, the two annular gears 325 and 344, the ring 314 and the frame 315 with its associated elements will simply turn from the position shown in Fig. 3 into the position shown in Fig. 1a.

It has been explained that the shaft 309 is driven from the shaft 306 in accordance with the quantity $dR_H$ and now regarding the shaft 288 as fixed the shaft 309 will drive the center 310′ of the differential 310 and through the side 310‴, gear 328, shaft 327 and gear 326 the annular gear 325 will be displaced with respect to the ring 314 which will now be regarded as fixed. The movement of annular gear 325 relatively to ring 314 will through the pinion 322, shaft 320, bevel gears 319 and screw 318 position the block 317 in accordance with the quantity $dR_H$.

Assuming now that the crank 339 is turned in accordance with the estimated rate of climb of the target and is operatively connected to the gear 336, the latter will through the shaft 335, bevel gears 334, shaft 333, bevel gears 332 and shaft 331 correspondingly turn the center 330″ of the differential 330. Regarding the side 330′ of the differential as being fixed since it is connected to the shaft 288 which is now regarded as fixed, the other side 330‴ will be turned to drive through the gears 342 and 343, the annular gear 344 relatively to the ring 314. This movement of the gear 344 will be therefore transmitted to the pinion 345, shaft 346, bevel gears 348 and pinion shaft 349 to position the rack 350 in accordance with the rate of climb of the target, that is in accordance with the quantity $dC$.

As a result of the operations described above the rod 353 will be positioned by the block 317 in accordance with the quantity $dR_H$ and by the rack 350 in accordance with the quantity $dC$. The movement imparted to the rod 353 will position the slide 354 in accordance with the rate of change of direct range, $dR$, for this equals $dR_H \cos A + dC \sin A$ as the mechanism is arranged.

The movement imparted to the vertical slide 355 is in accordance with the component of the target's travel across the line of sight in a vertical plane and is designated as $RdA$. This quantity equals $dR_H \sin A + dC \cos A$ in the arrangement of the apparatus.

The vertical movement of the slide 355 is transmitted through a pinion 356 to one side 357′ of a differential 357, the center 357″ of which is attached to a shaft 358 shown partly in broken lines in Fig. 1a which operates a contact device 359 similar to those previously described and represented diagrammatically as was the device 309. As shown most clearly in Fig. 2 this device controls selectively circuits from the main 218 through conductors 360, contact elements 361 of the control switch 221 and conductors 362, the reversely wound field windings of a motor 363 and the armature to the main 224. Through a shaft 364 and pinion 365 the motor drives the other side 357‴ of the differential 357 and also a slide 366. As in the case of the quantities $RdB_N$ and $dR_H$ the elements just described constitute a follow-up system by which the movement of the vertical slide 355 is transmitted to the slide 366 to operate it with increased power from the motor 363.

Attached to the slide 366 is a slotted bar 367, the upper end of which is retained by a fixed pin 368. A pin 369 is attached to a member 370 slidably mounted on the horizontal arm of the $$\frac{1}{R}$$

member 240, similar to the pin 238 and member 239 previously described. The pin 369 also passes through the slotted vertical arm of a horizontally movable slide 371. Since the slide 366 and therefore the bar 367 are positioned in accordance with the quantity $RdA$ while the pin 369 is positioned in accordance with $$\frac{1}{R}$$

the movement imparted to the slide 371 will be the product of these quantities or $dA$. The movement of the slide 371 is transmitted by a pinion 372, shaft 373 and pinion 374 to the rack 286 which is connected to the ball carriage 285 of the variable speed device 283.

The roller 282 of the device will therefore be driven in accordance with the rate of change of angle A and will through shaft 281, bevel gears 280, slide 268‴ and its center 268″ drive the shaft 269 since it is assumed that at this time the pointer's handwheel 264 is not being turned so that the other side 268′ of the differential is held fixed. The movement of shaft 269 will be transmitted through bevel gears 271 and shaft 272 to the worm 273 to turn the sector 274 and through link 275 and arm 276 cause the telescopes 6 and 7 to automatically follow the movement of the target in elevation as the mechanism previously described caused them to be moved in train from the variable speed device 26. At the same time the value of the angle A will be continuously indicated by the dial 270, geared to the shaft 272.

It has been previously described that the slide 354 is displaced horizontally in accordance with the rate of change of range, dR. The movement imparted to this slide is transmitted through a pinion 375 to a shaft 376 which turns a dial 377 showing the values of this quantity. The shaft 376 carries at its other end a pinion 378 meshing with a rack 379 connected to the ball carriage 380 of a variable speed device 381 consisting of a disc 382 driven at constant speed by the motor 20 and a roller 383 connected to a shaft 384 which through bevel gears 385, shaft 386 and gear 387 drives the side 246''' of the differential 246. Assuming that the center 246' of the differential is held fixed after an initial setting by the crank 244 and shaft 245, the other side 246'' of the differential will be driven and through gear 247, shaft 248 and gear 249, the inverse range gear 243 will be automatically driven from the variable speed device 381 as will also the range dial 253 on the end of shaft 243.

As a result of the operations described above the telescopes 6 and 7 will be automatically driven in train and elevation and the range dial 253 in range in accordance with the estimated movement of the target for which the elements of the instrument have been set. If the estimated movement agrees with the actual movement the lines of sight of the two telescopes will be maintained upon the target and the range indicated will correspond to the actual range, but in practice the initial setting of the instrument will not be exact so that the observers will notice a deviation of the target from the cross wires of their telescopes. By means of mechanism now to be described the movements of the telescopes may be adjusted to cause their lines of sight to be accurately maintained upon the target in both train and elevation and the range to be correctly indicated.

In connection with the description of this mechanism, which will hereinafter be referred to generally as the rate control mechanism, reference will be made to Fig. 5. Any target or wind angle referred to a horizontal plane will be in one of four quadrants, the first, Q1, being that between two lines at 45° each to the line of sight and the others, Q2, Q3 and Q4 following the clockwise direction around the circle.

Considering first the mechanism by which the trainer applied corrections to the instrument and assuming that the trainer notices a deviation of the target from the vertical cross wire of his telescope, he turns his handwheel 10 in the proper direction to shift his telescope to bring the target on to this cross wire. This is accomplished through the bevel gears 11 and 12, the side 13' of differential 13 and the center 13'' for the other side 13''' may at this time be regarded as fixed or positively driven. The movement imparted to the center of the differential will through the shaft 14 and pinion 16 turn the instrument in train to bring the target unto the vertical cross wire.

In order, however, that the condition set up by the trainer may continue, a correction to the rate of train of the instrument is necessary. For this purpose the handle of the trainer's handwheel is provided with a suitable switch 388 which is shown in connection with the circuits of the instrument in Fig. 2. The switch is connected to the main 218 and carries a contact element adapted to co-act with another contact piece mounted on a flexible arm 389 and below which is a third contact element 390. Connected to the arm 389 is a conductor 391 from which a branch 391' leads to the electro-magnet 392 of a clutch 393 shown in Fig. 1a and another branch 391'' leads to the electro-magnet 394 of a clutch 395 also shown in Fig. 1a. The circuits of the electro magnets are completed through conductor 396 to the main 224 of Fig. 2.

As shown in Fig. 1a the electro-magnet of the clutch 393 is connected to one side 397' of a differential 397 and the armature 398 of the clutch carries a gear which meshes with a gear 399 on the shaft 253 between the slides 251 and 255. The other side 397'' of the differential is connected by a pair of bevel gears 400 to a shaft 401 which at its other end carries a bevel gear 402 meshing with the bevel gear 12 connected to the side 13' of the differential 13. The center 397''' of the differential 397 is provided with a shaft 403 extending to a switch 404. The shaft 403 carries an arm 405 having a pin 406 extending from its outer end. An arm 407 is loosely pivoted on the shaft 403 and carries a pin 409 extending parallel to the pin 406. A spring 410 is coiled about the shaft 403 and has one of its free ends extending upwardly in contact with one side of each of the pins 406 and 409 and its other free end extending upwardly in contact with the opposite sides of the pins. The arm 407 is centralized by a C-spring 411 suitably anchored by having its upper ends engaging notches in opposite edges of the arm 407. The ends of C-spring 411 also normally engage opposite sides of a fixed abutment block 408. The arm 407 carries an insulated contact 412 which as shown in Fig. 2, in which the switch 404 is shown diagrammatically, is connected by a conductor 413 to the contact element 390 of the trainer's control switch. The contact 412 is adapted to engage one or the other of a pair of contacts 414 according to the direction of movement of the arm 407 upon which it is carried. In so doing, the arm 407 displaces one end of the C-spring 411, the other end of the spring being held from a following movement by the abutment block 408 thus storing energy in the spring which is used to restore the displaced arm 407 to its neutral position when the clutch 393 is not energized.

As the trainer turns his hand wheel in making correctional adjustments he will close his control switch 388 thereby energizing the clutch 393 so that the side 397' of the differential 397 will be operatively connected to the shaft 255. The rotation of his hand wheel will be transmitted through the bevel gears 11, 12 and 402, shaft 401 and bevel gears 400 to the side 397'' of the differential 397. Regarding the side 397' as fixed since it is clutched to the shaft 253 the center 397''' will be turned and through shaft 403 the arm 405 will be turned and through the pin 406 one or the other of the upwardly extending ends of the spring 410 will be moved to wind the spring and cause the other end of it to move the pin 409 and the arm 407 against the effect of the centralizing C-spring 411 until the contact element 412 comes into engagement with one or the other of the contacts 414. The spring 410 will permit additional movement of the shaft 403 with respect to the arm 407 of the contact device until movement of the shaft is checked.

As shown in Fig. 2, a conductor 416 extends through a switch 415' from the conductor 391, leading to the clutches 393 and 395, and through an electro-magnet 417 to the main 224. The electro-magnet 417 coacts with an armature 418 on the lower end of the control switch 221, so that when the trainer's control switch 388 is closed a circuit is established from the main 218 through the switch, contact arm 389, conductor 391, switch 415', conductor 415, and electro-magnet 417 to the main 224. The resultant actuation of the control switch 221 will, among other things, separate the contacts 220 and 222, and 226 and 227 to disconnect the R𝑑B motor 17 from the contact device 213 and put it under the control of the contact device 404. For this purpose the contacts 414 are connected by conductors 419 to a pair of contact elements 419' of the control switch, one of which coacts with the contact element 222 and the other with contact element 227 controlling the circuits 223 and 228 respectively to the motor 217.

Therefore when the contact device 404 is actuated by the trainer in making correctional adjustments in one or the other direction the motor 217 will be energized and through the gears 229, 230, shaft 231 and pinion 234 will move the slide 235. The movement of the latter will through the bar 236 and pin 238 displace the slide 251. The movement of the latter will through pinion 252 and gear 393 on shaft 253 turn the side 397' of the differential 397 since the clutch 393 is energized. Regarding the other side 397'' of the differential as fixed the center 397''' will be turned and thereby the shaft 403 in a direction to break the control circuit of the motor 217 which was established through the contact device 404. There is thus provided another follow-up control for the motor 217 the rotation of which through slide 235, bar 236, pin 238, slide 251, pinion 252, shaft 253, pinion 254 is transmitted to the slide 255 as previously described in connection with the initial training operation of the instrument. Through the mechanism previously described as being actuated from the slide 255 including the secant multiplying gear 263 the slide 260, the pin 258, the slide 290, pinion 291 and shaft 292, the ball carriage 29 of the variable speed device 25 will be shifted from the position which it occupied during the previously described operation of the apparatus. This will cause an alteration in the rate, at which the instrument will be trained by the variable speed device, to correct for the error discovered by sighting on the target.

In order, however, that the rate may be maintained in its proper corrected condition during the subsequent operation, it is necessary to adjust the position of the pin 93 for the target or the pin 140 for wind. For this purpose the transfer of control by the switch 221 of the R𝑑$_D$ motor 217 from the cam switch 213 to the rate control switch 404 simultaneously puts the course motor 83 or the speed motor 117 under the control of the cam switch 213. Referring to Fig. 1𝑎, it will be seen that the actuation of the R𝑑$_D$ motor 217 moves the slide 235 and the parts connected thereto and also drives the shaft 231 and through the pinion 232 the side 211''' of the differential 211. Regarding the other side 211' of the differential as being fixed the center 211'' will be turned turning the cam 213 to throw switch arm 215 into engagement with one of the other of the contacts 216.

As will be seen from Fig. 2 the conductors 219 and 225 leading from the contacts 216 will, after actuation of the control switch 221, be connected through contact elements 229 and 226 of the switch to fixed contact elements 220' and 226' respectively from which conductors 420 lead to two blades of a switch 421 which when in its right hand circuit closing position will connect these conductors to conductors 422 leading to the quadrant switch 100. The mechanism of this switch will hereinafter be described in detail, but at present it will be stated that it has a shaft 423 having four insulated sections each carrying a cylindrical element having an arm adapted to engage fixed contacts arranged around the shaft. A brush coacts with the element. One of the conductors 422 is connected to the brush associated with the bottom arm 424 which is thus electrically connected to the conductor. The companion conductor 422 is electrically connected by a similar arrangement to the next arm 425.

The arms 424 and 425 are shown in the quadrant 4 position where they are in engagement with contacts 426 and 427 respectively. From contact 426 a conductor 428 leads to one field winding of the speed motor 117. From contact 427 a conductor 429 leads to a conductor 430 from which a conductor 431 leads to the other field winding of the speed motor. Each circuit is completed through the armature of the motor to the negative main 224.

If the shaft of the quadrant switch be regarded as turned through 180° representing quadrant 2 the arms 424 and 425 will be in engagement with contacts 426' and 427' respectively. The former of these contacts is connected to the conductors 430 and 431 leading to the motor 117, while the latter is connected to the conductor 428 leading to the motor. It follows, therefore, that when the arms 424 and 425 of the quadrant switch are in engagement with the contacts 426' and 427' respectively the field windings of the motor 117 will be connected to the cam switch 213 reversely to that in which they are connected when the arms occupy the positions shown in Fig. 2.

In quadrants 2 and 4 an error in the established rate of change of bearing of the target will be due primarily to errors in the estimated speed of the target while in quadrants 1 and 3 such errors will be due primarily to errors in the estimated course of the target. Accordingly when the course of the target lies in quadrants 2 or 4 the speed motor 117 will be employed for adjusting the position of the pin 93 to maintain the corrected condition of the instrument while in quadrants 1 or 3 the course motor 83 will be employed for this purpose.

Fig. 2 shows that if the arm 424 be turned 90° from the position shown into engagement with a contact 426'' a circuit will be established from the conductor 422 connected to the arm 424 through a conductor 433 from which a conductor 434 leads to one field winding of the course motor 83.

When the arm 425 of the quadrant switch occupies a similar position in engagement with the contact 427'' a circuit will be established from the other conductor 422 through a conductor 435 from which a conductor 436 leads to one contact 437 of a relay 438 which will be described hereinafter. The other contact 439 of the relay is connected by a conductor 440 to the other field winding of the course motor 83.

As in the case of the connections through the quadrant switch between the conductors 422 and the field windings of the motor 117, there will be a similar reversal of connections between these conductors and the field windings of the motor 83 when the arms 424 and 425 are in engagement with contacts 426''' and 427''' respectively, opposite the contacts 426'' and 427'', as will be obvious when the circuits are traced.

If the target angle be in quadrant 2 or quadrant 4 in which cases the speed motor 117 would be controlled from the switch 213, the handle 109 will be manipulated to shift the arm 108 to bring the gear 113 into engagement with the gear 114 on shaft 115 connected to the motor. The latter will through the shaft and gears drive shaft 106, gears 105, shaft 104, gears 103, shaft 102, gear 101 and the side 96''' of the differential 96. Assuming its center 96'' to be fixed since it is connected to the target angle gear 90 the other side 96' will be turned to turn the target speed gear 95 to alter the position of the pin 93 in accordance with the correction required in the estimated speed of the target.

On the other hand, if the course of the target be in quadrant 1 or quadrant 3 the target course motor 83 would be controlled from the switch 213. The handle 75 will therefore be manipulated to shift the gear 79 into engagement with the gear 80 so that the motor will through shafts 81 and 71 drive the center 70'' of the differential 70. Assuming the side 70' to be fixed since it is geared to shaft 53, the other side 70''' will be turned to turn the target angle gears 85 and 90 and the target dial 87. This will alter the position of the pin 93 in accordance with the correction required to the estimated course of the target to compensate for the error which has caused the deviation of the target from the vertical cross wire of the trainer's telescope.

In both cases the resultant alteration of the position of the pin 93 will produce a corresponding displacement of the RadBr slide 118, turning through pinion 120, shaft 121 and gears 122 the side 123' of differential 123. Regarding its center 123'' as fixed the other side 123''' will be driven and through shaft 202 and pinion 210 drive the side 211' of differential 211. Regarding the side 211''' as fixed, the center 211'' will be turned to rotate the cam 213 and break the control circuit from the arm 215 to the motor 83 or the motor 117 as the case may be. In other words, the elements above described constitute a follow-up system for adjusting the speed or course of the target under the control of the trainer, so that after the correcting operation has been performed by him the telescopes 5 and 7 will continue to be automatically driven in train but will be more accurately maintained upon the target.

It will be understood that in practice corrections are applied to the instrument from time to time as required to maintain the lines of sight of the telescopes accurately upon the target. The ratios used in the gears which are interposed between the trainer's handwheel and the switch 404 will determine the magnitude of the correction which is applied for any given movement of the trainer's hand wheel and can be adjusted for any desired time interval between corrections to enable most efficient operation of the instrument.

In the foregoing description of the rate control features of the invention insofar as training is concerned, it has been assumed that the course and speed of Own Ship and direction and velocity of the wind are accurately known so that pin 187 which controls the Own Ship slides 194 and 195 and the pin 140 which controls the wind slides 170 and 171 are accurately positioned in accordance with the quantities which they represent. The course and speed of Own Ship may ordinarily be accurately determined, but there may be errors in the estimates of the direction and velocity of the wind. Assuming therefore that the angle and air speed of the target are accurately known the pin 140 can be repositioned by the rate control mechanism in a manner similar to that in which the pin 93 is positioned. Insofar as wind is concerned it bears the same relation to the quadrants of Fig. 5 as does the movement of the target. That is, in quadrants 1 and 3 errors in the positioning of the pin 140 will be due primarily to errors in the wind angle, while in quadrants 2 and 4 such errors will be due primarily to errors in wind velocity.

The control of the course motor 83 or the speed motor 117 by the cam switch 213 under the control of the trainer has been described and the circuits have been traced through the switch 421 and the quadrant switch 100. Operations in all respects like those previously described in connection with the rate control take place insofar as wind is concerned with certain exceptions as will now be noted.

In the first place the switch 421 is thrown to its left hand position so that the conductors 420 are connected through the two upper blades of the switch to a pair of conductors 441 electrically connected through brushes to the two lower arms 442 and 443 of the wind quadrant switch 162 which is in all respects like the quadrant switch 100, these arms being shown in the quadrant 4 position like the corresponding arms 424 and 425 of quadrant switch 100.

In this position the arm 442 engages a contact 444 from which a conductor 445 leads to a conductor 446 connected to the conductor 429 leading to one field winding of the speed motor 117. Similarly the arm 443 in the position shown engages a contact 447 which through a conductor 448 is connected to the conductor 431 leading to the other field winding of the motor 117. As in the case of the quadrant switch 100 when the arms 442 and 443 occupy positions 180° from those shown, that is the quadrant 2 position, they engage contacts 444' and 447' respectively. From the former contact a conductor 449 leads to the conductor 448 and from contact 447' a conductor 450 leads to the conductor 446. Therefore as in the case of the quadrant switch 100, when the arms 442 and 443 are in engagement with the contacts 444' and 447' respectively the field windings of the motor 117 will be connected to the cam switch 213 reversely to that in which they are connected when these arms occupy the positions shown in Fig. 2.

Also as in the case of the quadrant switch 100 the arms 442 and 443 will when turned 90° from the position shown engage contacts 444'' and 447'' respectively. From the former of these contacts a conductor 451 leads to the conductor 434 connected to one of the field windings of the course motor 83. From the contact 447'' a conductor 452 leads to the conductor 435 to establish a circuit from this contact through contacts 437 and 439 of the relay 438 and conductor 440 to the other field winding of the course motor 83.

As in the case of the connections through the quadrant switch between the conductors 441 and the field windings of the speed motor 117, there will be a similar reversal of connections between these conductors and the field windings of the motor 83 when the arms 442 and 443 are in engagement with contacts 444''' and 447''' respectively located opposite the contacts 444'' and 447'', as will be obvious when the circuits are traced.

In addition to shifting of the switch 421 to substitute the quadrant switch 162 for the quadrant switch 100, it is also necessary to connect the motor 83 to the shaft 131 and the motor 117 to the shaft 150 through the clutches 130 and 151 respectively. In Fig. 1b the motors are shown connected in this manner so that they are then selectively under the control of the switch 213, in accordance with the condition of the quadrant switch 162.

As in the case of a target angle lying in quadrant 2 or in quadrant 4 the speed motor 117 is under the control of the cam switch 213 when the wind angle lies in either of these quadrants. The motor drives through shaft 115, bevel gears 153 and 152, clutch 151, shaft 150, bevel gears 149, shaft 148 and bevel gears 147, the side 145''' of the differential 145 and its other side 145'', since the center 145' may be regarded as fixed as it is connected to the wind angle gear 137. Therefore, the wind velocity gear 142 will be turned to position the pin 140 in accordance with the correction required in the estimated velocity of the wind.

If the wind angle be in quadrant 1 or in quadrant 3 the course motor 83 is under the control of the switch 213. The motor will drive through shaft 81, bevel gears 128 and 129, clutch 130 and shaft 131, the center 58'' of differential 58. Regarding its side 58' as fixed, its other side 58''' will be turned to turn the wind angle gear 137 through the extension 135 and pinion 136. This will alter the position of the pin 140 in accordance with the correction required in the estimated direction of the wind.

In both cases the resulting alteration of the position of the pin 140 will produce a corresponding displacement of the $R_HdB_W$ slide 170. This will through pinion 172, shaft 173 and bevel gears 174 drive the side 175' of differential 175. Regarding its center 175'' as fixed, the other side 175''' will be driven and through the gears 200, the shaft 201 will be rotated. Referring to Fig. 1a, this will turn the center 123'' of differential 123 and regarding its side 123' as fixed, its other side 123''' will be driven to drive shaft 202 and pinion 210 and the side 211' of differential 211. Regarding the side 211''' as fixed, the center 211'' will be turned to rotate the cam 213 and break the control circuit from the arm 215 to the motor 83 or the motor 117 according to which one is in operation.

Simultaneously with the operations described above the wind velocity dial 159 will be repositioned in accordance with the corrected wind velocity. When the course motor 83 is being employed there will be a repositioning of the wind angle ring 168 in accordance with the corrected wind angle through bevel gears 163, shaft 164, bevel gears 165, shaft 166 and pinion 167, so that its index 169 read against the ring 68 gives the true direction of the wind.

Not only will there ordinarily be a deviation of the target in train as a result of errors in the estimates used in the preliminary settings of the instrument, but there will be corresponding errors in elevation which will be manifest to the pointer by the departure of the target from the horizontal cross wire of his telescope showing that the instrument is not accurately following the movement of the target in elevation. Upon observing a deviation of the target from the horizontal cross wire of his telescope the pointer turns his hand wheel 264 which through bevel gears 266 and 267 will turn the side 268' of the differential 268. Regarding the other side 268''' as fixed or positively driven at this time, the center 268'' will be turned and through the shaft 269, bevel gears 271, shaft 272, worm 273, gear sector 274, link 275 and arm 276, the telescopes may be adjusted in elevation until the pointer has restored the target to the horizontal cross wire of his telescope.

The handle of the pointer's hand wheel 264 is provided with a control switch 453 similar to that provided for the trainer and which as shown most clearly in Fig. 2 coacts with contact arm 454 and a contact element 455 from which a conductor 456 leads to the contact element 457 of a switching device in all respects like 404 and which therefore will not be described in detail but merely designated by the reference number 457.

The actuation of the pointer's control switch 453 establishes a circuit from the main 218 through a conductor 458', contact arm 454, conductor 391' and conductor 391'' to the electromagnet 394 of the clutch 395 previously referred to. At the same time there is established by means of the pointer's control switch the circuit of the electro-magnet 417 of the control switch 221 independently of the establishment of this circuit by actuation of the trainer's control switch 389, this circuit being established through the switch 415' and conductor 415 to the main 224. This organization of the electro-magnet 417 causes the control switch 221 to be shifted by the pointer to change the circuit connections as will be hereinafter described.

The electro-magnet element 394 of the clutch 395 is attached to a shaft 458 connected by bevel gears 459 to one side 460' of a differential 460, the center of which 460'' is connected by a shaft 461 to the contact device 457 by which the latter is actuated in the same manner that the contact device 404 is actuated from the shaft 403. The second side 460''' of the differential 460 is connected by bevel gears 462 to a shaft 463 passing through a bearing in the standard 5 and connected by a bevel gear 464 to the bevel gear 267 adapted to be actuated from the pointer's hand wheel 264. The armature side 395' of the clutch 395 is connected through bevel gears 465 to the shaft 373.

As the pointer turns his hand wheel 264 to bring the horizontal cross wire of his telescope on the target, he will through bevel gears 266, 267, 464 and 462, and shaft 463 drive the side 460''' of the differential 460. Assuming the clutch 395 to be energized by the closing of the pointer's control switch 453, as previously described, the side 460' of the differential which is connected to the clutch may be regarded as fixed so that the center 460'' will turn and through the shaft 461 actuate the contact element of switch 457 in one direction or the other to energize one or the other of a pair of contacts 466. The contact element of switch 457 as previously described is connected by conductor 456 to the now energized contact element 455 of the pointer's control switch. From the contacts 466 the circuit will continue through one or the other of a pair of conductors 467, a pair of contact elements 468 of the control switch 221 which at this time is held in its lower position by the electro-magnet 417 and then through one or the other of the pair of conductors 362 to the $R_dA$ motor 363 and thence to the main 224.

As a result of the operations described above the motor 363 will be driven in one direction or the other and through the shaft 364 and pinion 365 will move the slide 366. The movement of the slide will through the slotted bar 367 alter the position of the pin 369 in a horizontal direction thus imparting a similar movement to the slide 371. Through the pinion 372, shaft 373, pinion 374, the ball carriage 285 of the variable speed device 283 will be altered to change the rate at which the telescopes are driven in elevation from the device. At the same time the shaft 373 will through the bevel gears 405 and the energized clutch 395 drive the side 400' of the differential 400. Regarding the side 400''' as fixed the center 400'' will be driven to actuate through the shaft 461 the switch 457 to break the circuit of the motor 338 so that the parts of the instrument will be in a condition of adjustment for the corrected rate of change of elevation of the target.

As in the case of the train elements of the instrument, it is necessary to reposition the elements controlling the elevation rate in order that the correction applied as above described may be maintained. The changes in the angular position of a target in elevation at low angles, for instance below 40°, will be due primarily to its deviation from a horizontal course, that is, its climb. At higher angles, however, the speed or course of the target will have more effect upon variations in angular position. Therefore in the instrument the maintenance of the corrected condition is produced by operating the rate of climb motor 338 for a target at a low angle and by the speed motor 117 or the course motor 23 for a target at a high angle. It is accordingly necessary to provide a high and low angle switch 469 as shown in Fig. 2.

During the preliminary setting of the instrument as described above the RdA motor 363 is controlled from the switch 359 but the shifting of the control switch 221 will disconnect the switch 359 from the motor by breaking the control circuits at the contacts 361. The conductors 360 leading from the switch 359 will then be connected through the contacts 361 which are connected to the bar 221' of the control switch to contacts 470 from which conductors 471 lead to two of the blades 472 of the switch 469. When the switch is thrown to the right hand or low angle position the circuits continue through contacts 473, a pair of conductors 474, a pair of contacts 475 and a pair of conductors 476 to the reversely wound field winding of the dC motor 338 after which the circuits continue through the armature to main 224.

Assuming that the shifting device 337 is in a position to connect the gear 336 to the motor 338, the latter will through shaft 335, bevel gears 334, shaft 333, bevel gears 332 and shaft 331 drive the center 330'' of the differential 339. Regarding the side 330' of the differential as being fixed since it is connected to the elevation shaft 298 the other side 330''' will be turned to drive, through the gears 342 and 343, the angular gear 344 relatively to the ring 314. As heretofore explained this movement will be transmitted to the rack 350. This will alter the position of the rod 353 and displace the RdA slide 355. The movement of the latter will through pinion 356 move the side 357' of the differential 357 and regarding its side 357''' as fixed, its center 357'' will drive through the shaft 358 the contact device 359 in a direction to break the circuit of the motor 338 which has been under the control of this device during the operations just described. The elements of the instrument are accordingly repositioned in accordance with the correction required in order that the telescopes may accurately follow the movement of the target in elevation.

The mechanism for correcting the range rate will now be described for a target at a low angle. In this case if the course of the target be in either quadrant 1 or quadrant 3 variations in speed will produce the major effect in changes of range rate while in either quadrant 2 or quadrant 4 changes of course will be the determining factor.

As previously described the estimated range of the target is set into the instrument by the handle 244 and the shaft 245. The handle is provided with a switch 477 which as shown in Fig. 2 carries a contact element 478 to which the conductor 416 is connected. This contact element is normally in engagement with a contact element 479 from which a conductor 480 leads to an electro-magnet 481, the other terminal of which is connected to the main 224. The switch 477 carries a pair of lower contact elements adapted to engage a pair of contacts 482, the right hand one of which is connected to the main 218 and the left hand one by a conductor 483 to the coil of an electro-magnetic clutch 484 from which the circuit is continued through the main 224.

As shown in Fig. 1a the electro-magnetic element of the clutch 484 is connected to a shaft 485 connected by a pair of bevel gears 486 to the range shaft 245. The armature element 487 of the clutch is slidably mounted on a shaft 488 which by bevel gears 489 is connected to one side 490' of a differential 490, the center 490'' of which is connected to a shaft 491 for operating a switch 492 similar to the switches 454 and 457 previously described. The other side 490''' of the differential is connected by gears 493 to the shaft 376 through which the position of the ball carriage 386 of the variable speed device 381 is adjusted. As shown most clearly in Fig. 2 the arm of the switch 492 is connected to the main 218. A conductor 494 leads from the main to a contact element 495 of the control switch 221. The contacts 496 with which the switch 492 coacts are connected by a pair of conductors 497 to the blades 498 of the high and low angle switch 469.

When the range switch 477 is closed a circuit will be established from the main 218 through right hand contact element 482, the blade of the switch, conductors 416 and 415, electromagnet 417 to the main 224 to energize the electro-magnet to shift the control switch 221 into its rate controlling position. At the same time a circuit will be established from the main 218 through the contact elements 482 and the blade of the switch, through conductor 483 and the electro-magnetic clutch 484 to the other main 224. Therefore the movement imparted to the shaft 245 by operation of the handle 244 will through bevel gears 486, shaft 485, energized clutch 484, shaft 488 and bevel gears 489 be transmitted to the side 490' of the differential 490. Regarding the side 490''' as fixed since it is connected to the shaft 376, the center 490'' will be turned and through the shaft 491 the arm of the switch 492 will be turned to engage either one of the contacts 496 to establish a circuit over one or the other of each of the following pairs of elements; conductors 497, blades 498 of the switch 469 which at this time is in its low angle position, contacts 499 with which the blades are in engagement, a pair of conductors 500, a pair of contact elements 501 of the control switch 221 and one or the other of the conductors 303 leading to the field windings of the $dR_H$ motor 304 from which the circuit is completed through the armature to the main 224.

The motor will then through gears 305, shaft 306, bevel gears 308 and shaft 309 turn the center 310' of differential 310. Regarding the side 310'' of the differential as fixed the other side 310''' will be turned and through the gear 326, shaft 327 and gear 325 the annular gear 325 will be turned. Regarding the ring 314 as fixed, the relative movement between it and the gear 325 will cause a displacement of the block 317 by the pinion 322, shaft 320, bevel gears 319 and screw 318. This will result in a displacement of the rod 353 to shift the $dR$ slide 354. The movement of the slide will be transmitted through the pinion 375 to the shaft 376 to alter the position of the ball carriage 339 of the variable speed device 331, thereby altering the rate at which the roller 383 drives the shafts 384 and 386 and the inverse range gear 243 and the range dial 259 through the sides 246''' and 246'' of the differential 246, the center 246' being regarded as fixed.

The shaft 376 will also through gears 493 drive the side 490''' of the differential 490 and regarding its other side 490' as fixed its center 490'' will be turned and through the shaft 491 will break the control circuit of the switch 492 to de-energize the motor 304.

In order, however, that the corrected range condition may be maintained the heretofore described movement of the shaft 306 will also be transmitted through the bevel gears 307 to the side 298''' of the differential 298. Regarding its other side 298' as fixed its center 298'' will be turned to operate the switch 300 through the shaft 299. Reference to Fig. 2 shows that the shifting of the control switch 221 has at the contacts 302 broken the control circuits from the switch 300 over conductors 301 to the conductors 303 leading to motor 304 and has established circuits from the contacts 302 over the conductors 502 leading to the two lower blades of switch 421. When the switch is in its right hand closing position the conductors 502 are connected through the blades to two conductors 503, the left hand one of which is electrically connected to an arm 504 of the quadrant switch 109, while the right hand one is connected to a similar arm 505. As in the case of the arms 424 and 425, the arms 504 and 505 are adapted to engage contacts arranged around the shaft of the quadrant switch. The contacts with which the arm 50 coacts are designated 506, 506'', 506' and 506''' in the order in which they are arranged around the shaft. The contacts with which the arm 555 coacts are designated 507, 507'', 507' and 507''' in their order.

In view of the assumed angle of the target the arms of the quadrant switch should be regarded as occupying their quadrant 1 position, that is with the arm 504 in engagement with contact 506'' and the arm 505 in engagement with contact 507''. From contact 506'', a conductor 508 leads to the conductor 428 which is connected to one of the field windings of the speed motor 117. From the contact 507'' a conductor 509 leads to the conductor 431 leading to the other field winding of the motor 117.

When the arms 504, 505 occupy positions 180° from those assumed above, that is, when they are in the quadrant 3 position, they will be in engagement with contacts 506'''' and 507'''' respectively. Contact 506'''' is connected to the conductor 431 leading to the motor 117 and the contact 507'''' is connected to the conductor 428 leading to the same motor. In other words, the contacts 506''' and 507''' are connected to the conductors leading to the motor in reverse order to that in which the contacts 506'' and 507'' are connected, so that the direction of rotation of the armature of the motor will be reversed when the arms 504 and 505 occupy their quadrant 3 position as compared with their quadrant 1 position.

When the arms 504 and 505 occupy the positions shown in Fig. 2, that is, the quadrant 4 position, they are in engagement with contacts 506 and 507 respectively. The contact 506 is connected to the conductor 436 from which the circuit extends through contacts 437 and 439 of the relay 438 and conductor 440 to one field winding of the course motor 83. The contact 507 is connected to the conductor 433 which is connected to conductor 434 leading to the other field winding of this motor.

When the arms 504 and 505 occupy positions 180° from those shown in Fig. 2, that is, the quadrant 2 position they are in engagement with contacts 506' and 507' respectively. The former of these contacts is connected by a conductor 510 to the conductors 433 and 434 leading to the motor 83. The conductor 507' is connected by a conductor 511 to the conductor 436 leading to the same motor through the relay 438. By virtue of this arrangement the connections to the motor 83 will be reversed when the the arms 404 and 405 are turned 180° from the positions shown in Fig. 2.

On account of the connections just described the speed motor 117 will be controlled from the switch 300 over conductors 301, contacts 302, conductors 502, switch 421, conductors 503 and the quadrant switch 109 when the target angle is in quadrant 1 or in quadrant 3, while the course motor 83 will be controlled from the switch 300 over the same circuits when the target angle is in quadrant 2 or in quadrant 4. In the case of a target angle in quadrant 1 or in quadrant 3 and assuming that motor 117 has been connected to the shaft 106 by operating the clutch 107 and regarding the center 96'' of the differential 96 as being fixed, its sides 96''' and 96' will be turned by the motor through shaft 106, gears 105, shaft 104, gears 103 and shaft 102 to turn the target speed gear 95 to reposition pin 93 in accordance with the corrected condition of the instrument. The displacement of the pin 93 will move the slide 119 and through pinion 124, shaft 125 and gears 126 the sides 127' and 127''' of the differential 127 will be turned, its center 127'' being regarded as fixed. Through gears 207, shaft 208, gears 209 and 297, the side 298' and center 298'' of differential 298 will be driven since its side 298''' may be regarded as fixed. The movement thus imparted to shaft 299 will operate switch 300 to open the circuit of motor 117.

If on the other hand, the connections through the quadrant switch are such that the course motor 83 is under the control of the switch 300 the motor will through shaft 81, gears 80 and 79 which at this time are in engagement, clutch 72 and shaft 71 turn the center 70'' of the differential 70. Regarding its side 70' as fixed since it is connected to shaft 53 through pinion 65 the other side 70''' will be turned to turn the target angle gears 85 and 90 and the target dial 87 to reposition the pin 93 as to course in accordance with the corrected condition of the instrument. As before, the movement imparted to the slide 119 by the repositioning of the pin will through the differentials 127 and 298 break the control circuit of the motor 83 at the switch 399.

In each of the cases described above the pin 32 is repositioned vertically in order that the elements of the instrument which are actuated in accordance with the range of the target may be maintained in their corrected condition after the range operator opens his switch 477 to restore the instrument to its first described condition of operation in which its range elements are automatically and continuously operated.

For a target at a high angle, for instance above 40°, and having a course in quadrant 1 or quadrant 3 the errors in its rate of change in elevation will be due primarily to errors in the estimate of its speed, while in quadrant 2 or quadrant 4 the errors will be due primarily to errors in its estimated course. These conditions correspond to those of the errors in range rates for low altitudes. The corrections for errors in elevation at high angle are therefore applied over the same circuits and through the same elements as were the range rate corrections previously described, for when the switch 469 is thrown to its left hand or high angle position, the control from the switch 457 takes place through the motor 363, the switch 359 actuated thereby, the conductors 369 leading from the switch and passing through the contacts 391 and 470 of the control switch 221 and the conductors 471 leading to the blades 472 of the switch 469 which at this time are in engagement with contacts 500' to which the conductors 500 are connected. These conductors as previously described control the motor 394 which controls the switch 399 from which circuits are established over the conductors 391 and the contact elements 392 of the control switch 221 to the conductors 392 and 393 leading to the quadrant switch 152. The latter will as previously described in connection with the range rate control at low angles control the course motor 83 or the speed motor 117 according to the quadrant in which the target angle lies to reposition the elements of the apparatus to maintain it in its corrected condition after the rate controlling operation has been performed.

Similarly for a target at a high angle the error in its rate of change of direct range will be due primarily to errors in its estimated rate of climb for all quadrants. Therefore, when the switch 469 is thrown to its high position the conductors 497 leading from the switch 492 which is under the control of the range operator as previously described will be connected through the blades 498 of the switch, contacts 475 and conductors 476 to the rate of climb motor 333 so that the subsequent operation of the apparatus and the repositioning of its elements by this motor will take place as heretofore described in connection with the corrections for altitude under the control of the switch 457 when the switch 469 is in its low angle position.

In other words, the switch 469 in both of the cases considered above simply interchanges the controls from the switches 359 and 492 from those required for low angles to those required for high angles or vice-versa because the contacts 473 with which the blades 472 are in engagement in the low angle position of the switch are connected by conductors 474 to contacts 475 with which the blades 498 are in engagement in the high angle position of the switch. Similarly the contacts 499 with which the blades 498 of the switch are in engagement for a low angle are connected by conductors 500 to contacts 500' with which the blades 472 are in engagement when they are in their high angle position.

The manner in which the pin 149 controlling the wind slides 170 and 171 is repositioned by the rate control mechanism insofar as training is concerned has been described. The instrument also provides for a similar repositioning of the pin insofar as corrections in the vertical plane of sight is concerned. With a wind angle in quadrants 1 or 3 errors in the positioning of the pin are due primarily to errors in the estimates of the velocity of the wind. In quadrants 2 or 4 such errors are due primarily to errors in estimates of the direction of the wind. At low angles the wind errors are manifest as errors in range, while at high angles they are manifest to the pointer as errors in elevation like those for a target at a high angle. Inasmuch as wind has no appreciable component corresponding to the rate of climb of a target the corrections in elevation or range which control the rate of climb have no corresponding control on the wind.

Therefore errors in the estimated direction and velocity of the wind at low angles are corrected by the same elements as described in connection with the range rate correction for a target at a low angle except that the switch 421 is thrown to its left hand circuit closing position to connect the conductors 502 to conductors 512 leading to the wind quadrant switch 152 where they are electrically connected through brushes to arms 513 and 514, each of which is adapted to coact with four contacts arranged around the shaft of this switch.

Similarly errors in the estimated direction and velocity of the wind at high angles are corrected by the same elements as described in connection with the elevation correction for a target at a high angle with the exception that the wind quadrant switch 152 is used.

Since in both cases the switch 399 controls the motor 83 or the motor 117 according to the quadrant in which the wind angle lies, it is only necessary to describe the elements of the wind quadrant switch which have not heretofore been referred to and their connections to the motors.

The contacts with which the arm 513 coacts are designated 515, 515'', 515' and 515''' in the order in which they are arranged around the shaft. The contacts with which the arm 514 coacts are designated 516, 516'', 516' and 516''' in their order. Contact 515 is connected by a conductor 517 to the conductors 452 and 436 through which the circuit continues through contacts 437 and 439 of the relay 438 and conductor 440 to one field winding of the course motor 83. The contact 515' is connected by a conductor 518 to the conductor 451 which is connected to conductor 434 leading to the other field winding of the motor 83. The contact 515'' is connected to the conductor 450 which is connected to the conductor 446 leading to one field winding of the speed motor 117. The fourth contact 515''' is connected to the conductor 443 which is connected to conductor 431 leading to the other field winding of the motor 117.

The contact 516 with which the arm 514 coacts is connected by a conductor 519 to the conductor 451 leading to the conductor 434 connected to one field winding of the motor 83. The opposite contact 516' is connected by a conductor 520 to the conductor 452 from which the circuit continues through contacts 437 and 439 of the relay 438 and conductor 440 to the other field winding of the motor 83. The contact 516'' is connected to the conductor 448 leading to conductor 431 which is connected to one field winding of the speed motor 117. The opposite contact 516''' is connected to the conductor 446 leading to the other field winding of the same motor.

By virtue of the connections described above the switch 300 will control the speed motor 117 over conductors 301, contacts 302, conductors 502, switch 421, conductors 512 and the circuits through the arms and contacts of the quadrant switch 162 for wind angles in quadrants 1 or 3, in a manner similar to that in which the switch 300 controls the same motor through the switch 100 for a target angle in either of these quadrants.

Similarly, the switch 300 controls the course motor 83 over the same circuits and elements, as described above, when the wind angle lies in quadrants 2 or 4.

It will be understood that under these conditions of operation the motor 83 will drive through the shafts, gears and differential 58, the wind direction gear 137, as has been heretofore described in the operation of positioning the pin 140 in train. Similarly the motor 117 will drive through the shafts, gears and differential 145 the wind velocity gear 142 as previously described.

The repositioning of the pin by either of the motors will cause an actuation of the vertical slide 171, the movement of which will be transmitted through pinion 176, shaft 177, and bevel gears 178 to the side 179' of differential 179. Regarding the center 179'' as fixed the side 179''' will be turned and through shaft 181', center 127'' and side 127''' of differential 127, bevel gears 207, shaft 208, gear 209, gear 297, side 298' and center 298'' of differential 298 and shaft 299 the switch 300 will be operated to open the circuit of the motor which is repositioning the pin 140. Simultaneously with the repositioning of the pin, the wind velocity dial 159 and the wind angle ring 168 will be set in accordance with the corrected condition of the instrument in a manner similar to that previously described in connection with wind corrections insofar as training is concerned.

In the foregoing consideration of the rate control features of the instrument the correction of errors in the estimates of any of the quantities has been considered solely with respect to such quantities without considering their effect upon other quantities. For instance, in considering the effect of an error in the estimate of the speed of a target having a target angle in quadrant 4 no consideration has been given to the effect of the correction of target speed on the range rate or vertical angular rate.

By way of illustration, one specific case will be considered to show the operation of the instrument under these conditions. For this purpose it will be assumed that the course of the target is along the line DE of quadrant 4 as shown in Fig. 5. In such a case the slot 91 of the target angle gear 90 will lie at an angle to both of the slides 118 and 119 so that when the pin 93 is repositioned by the target speed motor 117 as previously described in connection with the training rate control it will not only move the slide 118 to de-energize the target speed motor which at this time is under the control of the switch 213, but it will also cause the actuation of the slide 119 which through the differentials 127 and 298 will operate the switch 300 to control the target course motor 83 which is under the control of the switch 390 under the conditions assumed. The course motor will through the differential 70 turn the target angle gears 85 and 93 to restore the slide 119 to its original position without altering the position of slide 118 as determined by the new position of pin 93 to maintain the instrument in its corrected condition in train. This may cause a reaction on the switch 213 to again drive the speed motor but a condition of equilibrium will finally be reached. It is thus to be seen that when the component controlling one rate is corrected the other components remain at their previous value unless intentionally corrected.

In connection with this feature, at all times when the range rate correction switch 477 is open and either or both of the trainer's and pointer's switches 388 and 453 respectively are closed, a circuit will be established from the main 218 through switch 388 and/or switch 453, contact 389 and/or contact 454, conductors 391, and 415, and 416, contacts 478 and 479 of switch 477, conductor 480 and electro-magnet 481 to the main 224. The electro-magnet 481 is fixed as shown in Fig. 1a so that when energized it attracts the armature 487 and locks the shaft 488 and the elements, such as the slide 354 controlled therefrom through switch 492 against accidental displacement. Actuation of switch 447 breaks the circuit of electro-magnet 481 to free the shaft 488 which is then clutched to shaft 485 by the armature 487 as previously described.

Reference has been made to the quadrant switches designated 100 and 162 and their shafts and contact elements have been described. The switches being similar the one designated 100 will be described in detail particularly in connection with Fig. 4 in which the actuating elements are shown more in detail and on an enlarged scale. As shown in Fig. 1a the switch 100 is actuated from the target angle gear 90 by the gear 97 which meshes with a gear 99 as well as with the target angle gear. The gear 99 is on a shift 521 which also carries a pinion 522, the latter being in mesh with a gear 523, which as shown in Fig. 4 is rotatably mounted on a stud 524. The gear 523 is provided with a sleeve 525 on the lower end of which is a pinion 526, which in turn is in mesh with a gear 527. The last named gear is loosely mounted on another stud 528 and is provided on its under side with a pair of pins 529 and 530. Spaced below the gear 527 and also loosely mounted on the stud 528 is a mutilated gear 531 consisting of a disc provided with two depending gear teeth 532 and 533 between which there is a single tooth notch.

Coacting with the mutilated gear 531 is a pinion 535 having an upper portion 536 which is provided with four teeth and a lower portion 537 with four additional teeth. Its co-action with the mutilated gear 531 will be referred to hereinafter. The disc of the mutilated gear 531 is also provided with a pair of pins 538 and 539, which are spaced correspondingly to the pins 529 and 530 that are attached to the gear 527. The axes of upper pins 529 and 530 are coincident with the axes of the lower pins 538 and 539. Interposed between the upper gear 527 and the lower gear 531 is a C-shaped spring 540, which is wide enough to overlap each of the upper pins 529 and 530 and the corresponding lower pins 538 and 539, the ends of the spring 540 being curled about said pins. In being curled, a space is left between the main body of the spring and its turned over terminals for reasons to be explained later.

Assuming that the pinion 526 rotates the gear 527 in a counter-clockwise direction, the upper pair of pins 529 and 530 will be carried by the gear 527. The pin 529 of the upper gear 527 pulls against the curled end of spring 540 drawing the spring and pin 539 and accordingly the mutilated gear 531 until one side of the tooth 533 that extends below the disc of the gear 531 engages one of the eight teeth 537 of the pinion 535 when the lower gear 531 will be restrained from turning. This is for the reason that the pinion 535 is on the shaft 423 previously referred to, and which at its upper end carries a star wheel 542 which is provided with four sockets into one of which a roller 543, is ordinarily entered. The roller 543 is mounted in one end 544 of a bell crank lever 545 which is pivoted on pin 546. The bell crank lever 545 has a hooked shaped arm 547 having an extension 548 between bifurcated portions of which a pin 549 is mounted. Hooked over the pin 549 is a wire 550 which extends to and is part of a coiled spring 551, the other end of which is anchored to a post 552. The direction of pull of the spring and the wire 550 is such as to throw the roller 543 into engagement with one socket of the star wheel 542, whereby the engagement between the lower teeth 537 of the pinion 535 with the tooth 533 of the mutilated gear 531 deters rotation of the latter gear.

As the gear 531 is unable to turn counter-clockwise with the upper gear 527 its pins 538 and 539 also remain stationary. As a consequence, the lower left hand portion of the C-shaped spring 540 moves away from the lower pin 538. Simultaneously the lower right hand portion of the C-shaped spring 540 is unable to pass the now stationary lower pin 539. As a result of these conditions, the left hand end of the C-shaped spring 540 is moved in a counter-clockwise direction by the pin 529, while its right hand end is held stationary, there being a consequent storage of energy in the spring.

As the upper gear 527 continues to turn counter-clockwise, and the stress imposed on the lower gear of the two-part pinion 535 seeks to turn that pinion, the shaft 423 on which it is mounted and the star wheel 542 to dislodge the roller 543. The arrangement is such, however, that as the roller is sought to be dislodged, which would result in an inward movement of the hooked end 547, an arcuate projection 553 fast on the upper surface of gear 527 comes into the path of the free hooked end of the arm 547 to prevent the inward movement of such arm and the retraction of the roller 543 from its socket in the star wheel. The projection 553 on top of gear 527 continues in its annular orbit, during which time spring energy is stored, until the projection 553 passes beyond the nose of the free end of the arm 547 of bell crank lever 545. Immediately the stored energy of the spring 540 is released and the spring snaps to its expanded normal position. Because the projection 553 on the upper surface of gear 527 is now removed from the path of the free end of arm 547, the arm may move inwardly to permit the roller 543 to move out of the socket it has been occupying in the star wheel 542. Since the gear 527 is in a gear train, its rate of movement is restricted, but that of the lower gear 531 is not materially restricted after the separation of the roller 543 from the star wheel. Accordingly the stored energy of the C-spring 540 is applied through the lower right hand portion of that spring to the pin 539 whereby that pin and the gear 531 are turned in a counter-clockwise direction with great rapidity, which results in a similar snap-like rotation of the two-part integral gear 535 which is on the shaft 423, the shaft snapping rapidly around, and the design is such that its movement is through a quadrant of a circle.

The shaft 423 is the shaft which carries the contact arms 424, 425, 504 and 505. In view of the spring 551 and the wire 550 being disposed to normally force the arm 547 of the bell crank 545 outwardly, there is an immediate return of the roller 543 carried on the other arm 544 of the bell crank lever into the next socket of the star wheel 542 which has been turned through one-quarter of a circle to receive the roller. It will be understood that for suitable operation of the instrument the gear ratio between the target angle gear 99 and the quadrant switch will be such as to cause four actuations of the switch for one revolution of the gear 92, likewise that clockwise rotation of gear 527 will cause a similar sequence of operation but to drive shaft 423 in the opposite direction.

In the operation of the instrument as described above its rate control elements are controlled jointly by the trainer, pointer and range setter through their switches 382, 453 and 477 respectively. The invention provides in addition an auxiliary control whereby the rate control function performed by these operators through the agency of their switches may be performed by one operator.

For this purpose there is provided a switch 554, see Fig. 2, consisting of a central blade 555 connected by a conductor 556 to a conductor 557 leading to the main 213. The switch has two intermediate blades 558, both of which are connected by a conductor 559 to the conductor 415. The switch has two outer blades 560, each of which is connected by a conductor 561 to one of the conductors 419 leading from the switch 404 which as previously described, is part of the trainer's rate control mechanism.

A similar switch 562 has its central blade 563 connected to the conductor 557, its intermediate blades 564 connected by a conductor 565 to the conductor 415 and its outer blades 566 connected by conductors 567 to the conductors 467 leading from the switch 457 which as previously described is part of the pointer's rate control mechanism.

A third switch 568 has its central blade 569 connected to the conductor 557, its intermediate blades 570 connected to the conductor 415 and its outer blades 571 connected by conductors 572 to the conductors 487 leading from the switch 492 which is part of the range rate control mechanism.

As shown in Fig. 1a the shaft 431 which is connected by bevel gears 432, 12 and 11 to the trainer's hand wheel 10 drives through bevel gears 573 and shaft 574 a generator 575 connected by conductors 576 (shown for simplicity by a single line) to an indicating instrument 577, such as a voltmeter, located near the switch 554 in position to be conveniently seen by the operator who manipulates the switch. The shaft 463 which is connected by bevel gears 465, 267 and 266 to the pointer's hand wheel 264 drives through gears 578 a generator 579 connected by conductors 580 to a similar indicating instrument 581 located near the switch 562. The shaft 245 which is operated by the range setter drives through gears 582 a generator 583 connected by conductors 583' to an indicating instrument 584 located near the switch 568.

In the operation of the elements above described the switches 415' and 416' will be open to prevent energization of the clutches 393, 395 and 481 when the switches 554, 562 and 568 are operated. The clutch 484 will not be energized because its circuit will be broken at the range setter's switch 477 which under the present conditions of operation is not actuated as is also the case with the trainer's and pointer's rate control switches 388 and 453 respectively. The trainer and pointer simply observe deviations of the target from their cross wires and correct them by suitable manipulation of their hand wheels 10 and 264 respectively. The clutches 393 and 395 are not energized and therefore the movements imparted to the shafts 401 and 463 as the trainer and pointer restore the target to their cross wires will not cause any actuation of the switches 404 and 457 respectively. Instead the circuits from these switches through the pairs of conductors 419 and 467 respectively will be under the control of the operator who manipulates the switches 554 and 562. Similarly the range setter will apply range corrections without closing his rate control switch 477 so that the clutch 484 will not be energized and there will be no actuation of the switch 492 by the range setter. The circuits from this switch beginning with conductors 497 will be under the control of the operator who manipulates the switch 568 with switches 554 and 562.

Any movement of the shafts 401 and 463 as the trainer and pointer restore the target to their cross wires and of the shaft 245 as the range setter applies range corrections will generate currents in the generators 575, 579 and 583 in accordance with the rates at which their respective driving shafts are turned. The resultant deflections of the pointers of the indicating instruments 577, 581 and 584 give indications to the operator of the corrections required to maintain the target upon the cross wires of the telescopes and to maintain the correct ranges. He therefore manipulates switches 554, 562 and 568 as may be required. As soon as the central blade of any of these switches engages either of the intermediate blades, a circuit will be established through the blades from the main 218 to the conductor 415, the electro-magnet 417 and the other main 224. In the case of switch 554 the circuit will be established through conductors 557, 556, the blades of the switch and conductor 559. In the case of switch 562, the circuit will be established through conductor 557, the blades of the switch and conductor 565. In the case of switch 568, the circuit will be established through conductor 565. In the case of switch 568, the circuit will be established through conductor 557 and the blades of the switch. In any of these cases the energization of the electro-magnet 417 will shift the switch 221 to its rate control position.

Further actuations of the switch 554 will establish a control circuit from the main 218, conductors 557 and 556, one or the other of the outer blades 568 and conductors 561 and one or the other of the conductors 419 which under rate control conditions are connected through contacts 419'—222 and 419'—227 to conductors 223 and 228 leading to the R$d$B motor 217 which is therefore under the control of the operator in the same way that it is under the control of the trainer when the latter is performing the rate control operations. The remainder of these operations takes place as hereinbefore described and results in adjusting the position of the ball carriage 29 of the variable speed device 26 to alter the rate at which the instrument is trained to maintain its telescope upon the target.

In a similar manner actuation of the switch 562 will establish a control circuit from the main 218, conductor 557, one or the other of the outer blades 566 and conductors 567 and 467 leading to the contacts 468 of the switch 221. Under rate control conditions these contacts are connected to conductors 362 leading to the R$d$A motor 363 which is therefore under the control of the operator in the same way that it is under the control of the pointer when the latter is performing the rate control operation. As in the case of pointer's corrections, the ball carriage 285 of the variable speed device 283 will be adjusted to alter the rate at which the telescopes are moved in elevation to maintain them upon the target.

Actuation of the switch 568 will establish a control circuit from the main 218, conductor 557, one or the other of the outer blades 571 and conductors 572 and 497 leading to the switch 469. From this switch the control circuit will be continued to the $dR_H$ motor 304 or the $dC$ motor 338 according to the position of the blades 498 of the switch, as previously described in connection with the rate control operation for range. Under these conditions there will be a resulting adjustment of the ball carriage 380 of the variable speed device 381 to alter the rate at which the roller 383, shafts 384, 386 and 248 are driven, as previously described, to move the $$\frac{1}{R}$$

gear 243 and the dial 250 in accordance with range rate corrections.

In train, elevation and range the accurate adjustment of the elements of the apparatus by the operator will mean that there are no deviations of the target from the cross wires of the telescopes and the range setter will observe that the indications of dial 250 agree with the values received by him from the instrument which supplies range data. It will therefore be unnecessary for the trainer, pointer and range setter to make any adjustments. Under these conditions the shafts 401, 463 and 245 have no movements and no current is generated by the generators 575, 579 and 583 so that their indicating instruments are not affected, thus showing to the operator that the instrument is accurately following the target in both train and elevation and the range is correct.

In the rate control operation of the apparatus a condition may arise in which on attempting to control the mechanism in accordance with the speed of the target and/or velocity of the wind the speed and/or velocity will be brought to zero and in order to put the apparatus in proper condition the target and/or wind vectors should be rotated through 180° from the positions previously occupied by them. It is for this purpose that the relay 438 previously referred to is provided.

As will be seen most clearly from Fig. 2 a conductor 585 leads from the main 218 to switches 586 and 587 connected in parallel between the conductor and the electro-magnet of the relay, the circuit being completed through conductor 588 to the other main 224. As shown in Fig. 1a the switch 586 is associated with the gear 102' which drives the target speed dial 102'', the arrangement being such that when the dial reads zero or slightly below zero a pin 589 on the gear will engage an extended blade of the switch to close its contacts and therefore energize the electro-magnet of the relay 433. As shown in Fig. 1b the similar switch 537 is associated with the gear 158 which drives the wind velocity dial 159, so that when the latter reads zero or slightly below zero an alternative circuit through the electro-magnet of the relay 433 will be established.

The resulting movement of the armature of the relay will separate the contacts 437 and 439 to break whichever circuit is at that time established from the quadrant switch 108 or the quadrant switch 162 over conductor 440 to one of the field windings of the course motor 83. A conductor 590 is connected between a contact on the underside of the armature of the relay and leads to the conductor 433 which is connected by the conductor 434 to the other field winding of the course motor 83. When the electro-magnet of the relay is energized the contact just referred to engages a contact from which a conductor 591 leads to a contact 592 adapted to be engaged by the topmost contact 495 of the rate control switch 221.

It therefore follows that when this switch is in its rate control position a circuit will be established from the main 219 through conductor 494, contacts 495 and 592, conductors 591, 590, 433, and 434 to one field winding of the motor 83 from which the circuit will be completed through the armature of the motor to the other main 224. The armature of the motor will therefore be driven in a particular direction to turn the target angle gear 90 sufficiently from the position it occupied when the pin 93 reached its innermost position corresponding to zero speed of the target to permit the pin to travel in the opposite direction, under those conditions of operation in which the course motor is controlling the target angle gear. If on the other hand the motor is controlling the wind direction gear 137 of Fig. 1b, a similar change of direction of the slot 138 will take place to permit the pin 140 to move in the opposite direction after it has reached a position corresponding to zero wind velocity.

In either case reversal of direction of the slot 91 of the target angle gear will be accompanied by a corresponding change of position of the arms of the quadrant switch 109 to reverse the control of the speed motor 117 to cause it to rotate in the opposite or increasing direction to position the pin 93 in accordance with the correctional control. Similar operations will occur in connection with the elements of the wind mechanism when the quadrant switch 162 is in control of the speed motor.

In some cases it may be desirable to separate the computing mechanism, as it may be called, from the sighting device and place it in a more protected location than is the point at which the device must be located in order that targets may be viewed. Such an arrangement of the apparatus is shown in Fig. 6 in which the elements appearing in this figure and corresponding to those shown in Fig. 1a are designated by the same reference numerals, it being understood, however, that many of the elements have been omitted from Fig. 6 for the sake of simplicity. The shaft 401 which in Fig. 1a operates certain elements of the computing mechanism is in Fig. 6 connected to a transmitter 593 which is connected by a conductor 594 to a terminal 594' of a switch 595. For simplicity, one conductor only of a circuit is shown. When the blades of the switch are in their lower position the circuit will be continued through a conductor 596 to receiver motor 597 connected through gears 598 to a shaft which is in effect a continuation of the shaft 401 and is designated 401'. As in Fig. 1a this shaft is connected through bevel gears 402' and 12' to the side 13' of the differential 13 which is now placed at the computing mechanism instead of at the sighting device. The center 13'' of the differential is connected to a shaft 14' which at its upper end is connected by bevel gears 30' to a shaft 31' which through gears 32' drives a target bearing dial 33'. The lower end of the shaft 14' is connected to a transmitter 599 connected to a conductor 600 leading to a receiver motor 601 which drives a shaft 18 corresponding to the similarly designated shaft on Fig. 1a. This shaft drives through bevel gears 17 the shaft 14, to the lower end of which pinion 16 is attached, this pinion meshing with the fixed gear 3 of the pedestal on which the sighting device is mounted.

The portion of the shaft 14 below the bevel gear 12 is of non-circular cross section and carries a slidable clutch member 602 which when raised is adapted to engage a coacting member forming part of the bevel gear 12 to provide a driving connection from the trainer's handwheel 10 through bevel gears 11 and 12, clutch 602 and shaft 14 to the pinion 16 whereby the telescopes may be manually trained if for any reason this operation cannot be performed automatically from the computing mechanism.

Under normal conditions of operation, the instrument will function substantially as described in connection with Fig. 1a, it being understood that the side 13''' of the differential 13 is connected by bevel gears 17' to a shaft 18' which like the shaft 18 of Fig. 1a is connected through a differential 21 to the roller 25 of the variable speed device 26 which in Fig. 6 is intended to be located in the computing mechanism of the instrument. The correctional movement of the trainer's hand wheel 10 will be reproduced at shaft 401' of the computing mechanism through the agency of the transmitter 593 and receiver 597, it being understood that the switch 595 is in its lower position. The computing mechanism will function as hereinbefore described to alter the position of the ball carriage of the variable speed device 26 with consequent alteration of the rate of the shaft 18' and the shaft 18 to which movement is imparted by the transmitter 599 and receiver 601. The trainer will likewise manipulate his switch 388 for rate control, it being understood that this switch is electrically connected to its controlled elements in the computing mechanism.

As in Fig. 1a, the shaft 14 is connected by bevel gears 30 to a shaft 31 which drives the bearing dial 33, but as explained above the rest of the shaft is located in the computing mechanism of Fig. 6 where it is designated 31'.

The shaft 463 which as shown in Fig. 1a is connected through bevel gears 464, 267 and 266 to the pointer's handwheel 264 is in Fig. 6 connected to a transmitter 603 which by a conductor 604 is connected to a contact 604' of the switch 595. The coacting blade of the switch is connected by conductor 605 to a receiver motor 606 connected through spur gears 607 to a shaft 463' which is thus in effect a continuation in the computing mechanism of the shaft 463. The shaft 463' is connected by bevel gears 464' and 267' to a side 283' of differential 263 which in the embodiment of the invention now under consideration is located in the computing mechanism. The center 268'' of the differential is connected to a shaft 269' which through bevel gears 271' is connected to a shaft 272' provided with a pinion 277' meshing with a gear 278' for driving an elevation dial 279'. The gear 278' also drives a transmitter 608 which is connected by a conductor 609 to a receiver motor 610 connected to the shaft 291 which is connected through bevel gears 290 to the shaft 269. The shaft 269 drives through bevel gears 271, the shaft 272 and worm 273 which operates the gear sector 274 to move the telescopes in elevation. It also drives through gears 277 and 278 the elevation dial 279 similar to the one located in the computing mechanism of the apparatus. A clutch 611 on shaft 269 operates similarly to clutch 602 on shaft 14.

The second side 268''' of the differential 268 in the computing mechanism is connected by bevel gears 280' to shaft 281' leading to the roller 282 of the variable speed device 283 which in Fig. 6 will be understood to be located with the other parts of the computing mechanism.

The apparatus functions in elevation the same as in Fig. 1a, the correctional movement of the shaft 463 by the pointer being reproduced by the transmitter 603 and receiver 606 in the computing mechanism to cause corresponding movement of the shaft 463'. The resultant alteration at which the variable speed device 283 of the computing mechanism will drive the shaft 281' will be transmitted by the transmitter 608 to the receiver 610 at the sighting device to produce a corresponding movement in elevation through the shaft 291, bevel gears 290, shaft 269, bevel gears 271, shaft 272, worm 273 and gear sector 274 connected to the telescopes by the link 275. The pointer will manipulate his rate control switch 453 the circuit of which leads to the computing mechanism. If for any reason the electrical connections between the sighting device and the computing mechanism fail to function, the pointer by engaging clutch 611 with bevel gear 267 may move the telescopes in elevation independently of the automatic drive from the computing mechanism.

Not only does the invention provide for locating the computing mechanism at a distance from the sighting device, as explained in connection with Fig. 6, but it also provides for the control of a second sighting device from the first one and the computing mechanism to maintain such second device in condition to be quickly substituted for the first device in case the latter is rendered inoperative during an engagement or for any other reason. The second sighting device may be like the one shown in Fig. 1a and the left hand portion of Fig. 6 or it may be of some other type. For purpose of illustration the sighting device shown in the right hand portion of Fig. 6 has embodied therein a range finder 612 in addition to the pointer's and trainer's telescopes 6 and 7, respectively, which are shown attached to the range finder. For convenience this second sighting device will be designated as a whole by Z, the previously described sighting device being designated Y. Since, except for the range finder and its associated mechanism, the elements of the sighting device Z correspond to those of sighting device Y they are accordingly numbered.

In order that the sighting device Z may be driven in unison with the sighting device Y from the computing mechanism the conductor 600 leading from the training transmitter 599 is carried to the receiver 601 of sighting device Z. Similarly the conductor 609 leading from the elevation transmitter 608 is also carried to the receiver 610 of the sighting device Z. Therefore the telescopes 6 and 7 and the range finder 612 of this device will be maintained upon the same target as are the telescopes 6 and 7 of the sighting device Y so that the device Z may be connected to the computing mechanism in place of the device Y by throwing the switch 595 to its upper position, in which case the train transmitter 593 of device Z will be connected through conductor 594, contact 594'', the coacting blade of the switch and the conductor 596 to the receiver 597. Similarly the elevation transmitter 603 of device Z is connected by conductor 604, contact 604'', coacting blade of the switch and conductor 605 to the receiver 606. Under these conditions the apparatus is under the control of the trainer and pointer of device Z in the same manner that it was previously under the control of the operators of device Y.

In connection with the embodiment of the invention shown in Figs. 1a and 1b in which the sighting device and the computing mechanism are arranged in proximity, the rate controls first described are under the control of the trainer, pointer and range setter. In the arrangement shown in Fig. 6 the same is true insofar as sighting device Y is concerned for a range setter is required at the computing mechanism. It is possible however, to dispense with the range setter and arrange that his operation be performed by the range finder operator in the case of sighting device Z, thus providing in effect a remote control of the computing mechanism from the sighting device.

As shown herein the range finder 612 is provided with apparatus such as shown in my Patent No. 1,317,914 of October 7, 1919, for Apparatus for Transmitting Motion From One Movable Member to Another for rectifying the variable relation between the angular movement of the angle measuring device and the indicated range, the apparatus as a whole being designated 613 in Fig. 6 and certain elements thereof being shown on an enlarged scale in Fig. 7.

The shaft 614 of Fig. 7 corresponds to the driving shaft 5 of the patent referred to and is connected by gears 615 to a shaft 616 which is connected to a receiver 617 to which conductors 618 lead from a transmitter 619, see Fig. 1a, having a gear 620 meshing with a gear 249 on shaft 248 which drives the range dial 250. Loosely mounted on shaft 616, but adapted to be connected thereto by a clutch 621 like clutches 602 and 611, is a compound spur and bevel gear 622, the bevel gear of which meshes with a similar gear 623 connected to a hand wheel 624. The spur gear of the compound gear meshes with a corresponding gear 625 for driving a transmitter 626 which is electrically connected by a conductor 627 to a receiver 628 which in the embodiment of the invention now being described is connected to the end of shaft 245 of the computing mechanism in place of the range-setter's handle 244 shown in Fig. 1a.

In the operation of the apparatus described above the shaft 248 of the computing mechanism is, as previously described, driven from the variable speed device 331 in accordance with the estimated rate of change of range. The movement of the shaft is transmitted by transmitter 619 to receiver 617 to drive the shafts 616 and 614 to position the optical elements of the range finder in accordance with the estimated range.

If the range finder operator observes a lack of coincidence in his instrument he manipulates his hand wheel 624 to drive through gears 623, 622 and 625 the transmitter 626. The movement imparted to the latter will be reproduced by the receiver 628 to correspondingly turn shaft 245 to which it is connected. This will adjust the ball carriage of the variable speed device 331 in the same way that it is adjusted by the range-setter's manipulation of handle 244 in the embodiment of the invention shown in Fig. 1a. At the same time the operator will manipulate his range rate control switch 477' in the same manner that the range setter operates the corresponding switch 477 of Fig. 1a and for the same purpose, it being understood that this switch is electrically connected to its controlled elements in the computing mechanism.

When the apparatus is accurately adjusted the range finder operator will observe continual coincidence in his instrument and will no longer mainpulate his hand wheel and switch.

By engaging clutch 621 with compound gear 622 the operator may directly control the movement of shaft 614 of the range finder to adjust its optical elements manually when necessary on account of failure of the automatic drive from the computing mechanism or for any other reason.

While certain preferred embodiments of the invention have been shown and described it will be understood that it may be embodied in other forms and that various changes may be made in its structural details without departing from its principles as defined in the appended claims.

I claim:

1. In fire control apparatus, the combination of directional mechanism, means for automatically controlling the mechanism to follow a target in both train and elevation while there is substantially uniform relative movement between the target and the apparatus, and separately controlled means for adjusting the first named means to correct for changes in the relative motion between the apparatus and the target.

2. In fire control apparatus, the combination of directional mechanism, variable speed mechanism for moving the mechanism in elevation and train to follow the movement of a target, means for adjusting the variable speed mechanism in accordance with the estimated rates of movement of the target in elevation and train, and means at the directional mechanism operable independently of said movement of said variable speed mechanism and operative upon the adjusting means for applying corrections to the variable speed mechanism when the estimated rates differ from the true rates as manifest by deviation of the directional mechanism from the target.

3. In fire control apparatus, the combination of a support, a sighting device mounted upon the support for movement in train therewith and for movement in elevation with respect to the support, variable speed mechanism for moving the support in train, means operable independently of said support-moving action of said variable speed mechanism for adjusting said mechanism in accordance with the movement in train of the line of sight to a target to cause the line of sight of the device to be maintained upon the target, variable speed mechanism for moving the sighting device in elevation, and means operable independently of said sighting device-moving action of said last named variable speed mechanism for adjusting the last named variable speed mechanism in accordance with the movement in elevation of the line of sight to the target to cause the line of sight of the device to be maintained upon the target.

4. In fire control apparatus, the combination of a support, a plurality of connected sighting devices mounted upon the support for movement in train therewith and for movement in elevation with respect to the support, variable speed mechanism for moving the support in train, means operable independently of said support-moving action of said variable speed mechanism for adjusting said mechanism in accordance with the movement in train of the line of sight to a target to cause the lines of sight of the devices to be maintained upon the target, variable speed mechanism for moving the devices in elevation and means operable independently of the action of said last named variable speed mechanism in moving said sighting devices for adjusting the last named mechanism in accordance with the movement in elevation of the line of sight to the target to cause the lines of sight of the devices to be maintained upon the target.

5. In fire control apparatus, the combination of a sighting device, adjustable means for automatically driving the device in elevation and train to follow the movement of a target, means for displacing the sighting device independently of said driving means in accordance with corrections resulting from incorrect adjustment of said driving means, and means operable in accordance with the independent displacements of said sighting device to adjust the first named means in accordance with the corrections.

6. In fire control apparatus, the combination of directional mechanism, variable speed mechanism for driving the mechanism in train including an element actuated at a constant speed and a speed varying element, manually controlled electrically and mechanically operable means for shifting the speed varying element and the mechanism in train, variable speed mechanism for driving the mechanism in elevation including an element actuated at a constant speed and a speed varying element and electrically and mechanically operable manually controlled means for shifting the last named speed varying element and the mechanism in elevation.

7. In fire control apparatus, the combination of means for observing the relative angles between two objects in train and elevation, controlling means therefor, means for automatically moving said observing means independently of said controlling means proportional to changes in the relative angles, said automatic means being adjustable for required rates of operation, mechanism for determining such rates adjustingly connected to said automatic means, said controlling means being operable independently of said automatic means to correctively adjust said observing means, and means controllable at and operable with said controlling means when independently operated to reset said rate mechanism to correct the automatic movements when they differ from the observed relative movements in train and elevation.

8. In fire control apparatus, the combination of directional mechanism, means adapted to move the mechanism in accordance with the movements of a target relative to the apparatus in train and elevation, means for adjusting the mechanism when its movements differ from observed relative movements and means actuated by the adjusting means for controlling the moving means to bring the movements of the mechanism into correspondence with such relative movements.

9. In fire control apparatus, the combination of a device adapted to bear a predetermined relation to the line of sight between two relatively moving objects, means for automatically maintaining the device in such predetermined relation irrespective of relative movement between the objects in train and elevation and separately controlled means for adjusting said first named means to correct for changes in such relative movement.

10. In fire control apparatus, the combination of a device adapted to bear a predetermined relation to the line between two relatively moving objects, variable speed mechanism for driving the device in train, means for simultaneously shifting the device independently of the driving thereof from the variable speed mechanism and altering said mechanism to change the rate of movement of the device in train, variable speed mechanism for driving the device in elevation and means for simultaneously shifting the device independently of the driving thereof from the last named variable speed mechanism and altering the last named mechanism to change the rate of movement of the device in elevation.

11. In fire control apparatus, the combination of a device adapted to bear a predetermined relation to the line between two relatively moving objects, means for automatically maintaining the device in such predetermined relation irrespective of relative movement between the objects in train and elevation while the relative movement is substantially uniform, means for maintaining the range between the objects, means for adjusting the first named means to correct for changes in the relative movement between the objects and means for adjusting the range-maintaining means to correct for changes in the range rate between the objects.

12. In fire control apparatus wherein directional mechanism is operable by means for automatically controlling the mechanism to follow a target in both train and elevation while there is substantially uniform relative movement between the target and the apparatus, there being means for adjusting the controlling means to correct for changes in the relative motion between the apparatus and the target, the combination of a range element, means for automatically driving the range element in accordance with the range from the apparatus to the target and means for adjusting the range element driving means to correct for changes in range rate.

13. In fire control apparatus wherein a device is adapted to bear a predetermined relation to the line of sight between two relatively moving objects and in which there are means for automatically maintaining the device in such predetermined relation irrespective of relative movement between the objects in train and elevation while the relative movement is substantially uniform, the combination of a range element, means for automatically driving the range element in accordance with the range from the apparatus to the target and means for adjusting the range element driving means to correct for changes in range rate.

14. In fire control apparatus wherein a sighting device is operable by variable speed mechanism for driving the device in elevation and train to follow the movement of a target while there is substantially uniform relative movement between the target and the apparatus, there being means for adjusting the mechanism in accordance with the estimated rates of movement of the target in elevation and train, the combination of means operative upon the adjusting means for applying corrections to the mechanism when the estimated rates differ from the true rates as manifest by deviation of the line of sight of the device from the target, a range element, variable speed mechanism for driving the element, means for adjusting the last named mechanism in accordance with the estimated range of the target and means operative upon the last named adjusting means for applying corrections to the range element driving mechanism when the estimated range differs from the true range.

15. In fire control apparatus wherein a rotatable support has a sighting device mounted thereupon for movement in train therewith and for movement in elevation relatively to the support, and in which there is variable speed mechanism for moving the support in train, there being means for adjusting the mechanism in accordance with the movement in train of the line of sight to a target to cause the sighting device to be maintained upon the target, and there also being variable speed mechanism for moving the sighting device in elevation and means for adjusting the last named variable speed mechanism in accordance with the movement in elevation of the line of sight to the target to cause the sighting device to be maintained upon the target, the combination of a range element, variable speed mechanism for driving the range element, and means for adjusting the last named variable speed mechanism in accordance with the range of the target to cause the range to be maintained on the range element.

16. In fire control apparatus wherein a sighting device is operable by means for automatically driving the device in elevation and train to follow the movement of a target while there is substantially uniform movement between the target and the apparatus, there being means for correcting the first named means in accordance with changes in the relative motion between the target and the sighting device and means for displacing the sighting device in accordance with the correction applied to the driving means, the combination of a range element, means for automatically driving the element in accordance with the range of the target, means for correcting the range element driving means in accordance with changes in range and means for displacing the range element in accordance with the corrections applied to its driving means.

17. In fire control apparatus wherein there are means for observing the relative angles between two objects in train and elevation and means for automatically moving the aforesaid means proportional to changes in the relative angles, there being means for correcting the automatic movements when they differ from the observed relative movements in train and elevation, the combination of means for automatically generating movements proportional to the change of range between the objects, manually governable control means, adjusting means operable by manual corrective movements of the observing means, and means for automatically correcting the last named generated movements when they differ from the observed change in range between the objects responsive to the operations of said control means and adjusting means.

18. In fire control apparatus wherein a movable sighting device is operable by means adapted to move the device in accordance with the movements of a target relative to the sighting device in train and elevation while there is substantially uniform movement between the target and the apparatus, there being means for adjusting the device when its movements differ from observed relative movements, the combination of means actuated by the adjusting means for controlling the moving means to bring the movements of the device into correspondence with such relative movements, a range element, means for automatically driving the range element, means for shifting the range element when its movement differs from observed range and means actuated by the shifting means for controlling the range element driving means to maintain the movement of the range element in correspondence with the observed range.

19. In fire control apparatus wherein there are a sighting device and means for pointing the sighting device, the combination of a vector, means for adjusting the vector and means for continuously driving the sighting device and the vector from a component function of the vector.

20. In fire control apparatus wherein there are a sighting device and a plurality of variable speed devices for actuating the sighting device, the combination of a plurality of vectors, means operable from the vectors for controlling the rate setting elements of the variable speed devices, and means operable from the output of one of said variable speed devices for changing the angular position of said vectors.

21. In fire control apparatus wherein a sighting device is responsive to mechanism to control said device, the mechanism having elements adapted to be set in accordance with variable factors, and there being means for applying corrective movements to the sighting device, the combination of means operable from corrective movements applied to the sighting device to automatically change the variable factors of the mechanism.

22. In fire control apparatus wherein there are a sighting device and a mechanism having elements adapted to be set in accordance with variable factors, and in which there are means for controlling the sighting device from the mechanism, the combination of means for additionally controlling the sighting device, and means operable from said additional means for automatically reacting to alter one or more variable factors of the mechanism.

23. In a computing mechanism containing a vector and members representing components of said vector, means for selectively causing the component members to be adjusted from the setting of the vector, and means responsive to the adjustment of said component members for causing the vector to be adjusted from the setting of the component members.

24. In fire control apparatus wherein there are mechanism representing a target direction line and means for driving the mechanism to direct it at a target while there is substantially uniform relative movement between the target and the apparatus, the combination of a member adapted to be positioned in accordance with the movement of the target, an element actuated by the member in accordance with a component of the movement of the target, a second element actuated in accordance with a function of the range of the target, means actuated by the elements for multiplying the quantities represented by their movements and means actuated by the multiplying means for adjusting the means for moving the mechanism.

25. In fire control apparatus wherein there are mechanism representing a target direction line and means for driving the mechanism to direct it at a target while there is substantially uniform relative movement between the target and the apparatus, the combination of a member adapted to be positioned in accordance with the movement of the target, an element actuated in accordance with a component of the movement of the target, a second element actuated in accordance with a function of the range of the target, a mechanism actuated by the elements for multiplying the quantities represented by their movements, a part actuated in accordance with the result of the multiplication, a part movable in accordance with a function of the position of the target, means operable by the parts for multiplying the quantities represented by their movements and means under the control of the last named multiplying means for adjusting the means for driving the first mechanism.

26. In fire control apparatus wherein there are mechanism representing a target direction line and means for automatically driving the mechanism to direct it at a target while there is substantially uniform relative movement between the target and the apparatus, the combination of a member displaceable in accordance with a component of the movement of the target, a motor, a controlling device for the motor actuated by the member, a second member driven by the motor in accordance with the component of the movement of the target and mechanism under the control of the second member and including elements operable in accordance with functions of the position and movement of the target for controlling the means for automatically moving the first mechanism.

27. In fire control apparatus wherein there are a mechanism representing a target direction line and means for moving the mechanism in train, the combination of a member displaceable in accordance with the relative horizontal lateral deflection of the target, a motor, a controlling device for the motor actuated by the member, a second member driven by the motor in accordance with the relative horizontal lateral deflection of the target, a member movable in accordance with a function of the range of the target, means actuated by the motor driven member and the member driven in accordance with the range function for multiplying the relative horizontal lateral deflection of the target by the function of the range, a member positioned by said means in accordance with the product of said quantities, mechanism for referring the product to a horizontal plane including a part actuated in accordance with the elevation angle of the target and means actuated by the mechanism for controlling the means that moves the first mechanism in train.

28. In fire control apparatus wherein there are mechanism representing a target direction line and means for moving the mechanism in elevation, the combination of a member displaceable in accordance with the horizontal range rate of the target, a motor, a controlling device for the motor actuated by the member, an element controlled by the motor, an element movable in accordance with the elevation angle of the target, an element movable in accordance with the rate of climb of the target, a second member actuated from the elements in accordance with the component of the movement of the target across the line of sight in a vertical plane, a motor, a controlling device for the motor actuated by the last named member, a third member operated by the last named motor in accordance with the component of the movement of the target across the line of sight in a vertical plane, a fourth member movable in accordance with a function of the range of the target, mechanism operable by the third and fourth members for multiplying the quantities represented by these members, a fifth member actuated by the mechanism in accordance with the product of said quantities and means actuated by the last named member for controlling the means that moves the first mechanism in elevation.

29. In a fire control apparatus wherein there are mechanism representing a target direction line and means for automatically training the mechanism on a target while there is substantially uniform relative movement between the target and the apparatus, the combination of a member displaceable in accordance with the relative horizontal lateral deflection of the target, a motor, a controlling device for the motor actuated by the member, a second member driven by the motor in accordance with the relative horizontal lateral deflection of the target and mechanism under the control of the second member and including elements operable in accordance with functions of the position and movement of the target for controlling the means that automatically trains the first mechanism to direct it at the target.

30. In fire control apparatus wherein there are mechanism representing a target direction line and means for automatically elevating the mechanism to direct it at a target while there is substantially uniform relative movement between the target and the apparatus, the combination of a member displaceable in accordance with the horizontal range rate of the target, a motor, a controlling device for the motor actuated by the member, a second member driven by the motor in accordance with the horizontal range rate of the target and mechanism under the control of the second member and including elements operable in accordance with functions of the position and movement of the target for controlling the means that automatically elevates the first mechanism to direct it at the target.

31. In a fire control apparatus wherein there are a mechanism representing a target direction line and variable speed mechanism for driving the mechanism in train to direct it at a target while there is substantially uniform relative movement between the target and the apparatus, the combination of a member adapted to be positioned in accordance with the angle and speed of the target, an element actuated from the member in accordance with the horizontal lateral deflection of the target, means for modifying the actuation of the element in accordance with other factors affecting the horizontal lateral deflection, a second element actuated in accordance with a function of the range of the target, means for combining the modified actuation of the first element and the movement of the second element, a part actuated in accordance with a function of the angle of elevation of the target, means for combining the combined movements of the elements and the movement of the part to refer the combined movements of the elements to a horizontal plane and means actuated by the second combining means for controlling the variable speed mechanism that directs the first mechanism at the target.

32. In a fire control apparatus wherein there are a mechanism representing a target direction line and variable speed mechanism for driving the mechanism in elevation to direct it at a target in elevation while there is substantially uniform relative movement between the target and the apparatus, the combination of a member adapted to be positioned in accordance with the angle and speed of the target, an element actuated from the member in accordance with the horizontal range rate of the target, means for modifying the actuation of the element in accordance with factors affecting the horizontal range rate of the target, a second element actuated in accordance with the elevation angle of the target, a third element actuated in accordance with the rate of climb of the target, means for combining the modified actuation of the first element and the movement of the second and third elements, a part positioned by the combining means, a second member actuated by the part in accordance with the component of the movement of the target across the line to the target in a vertical plane, a third member actuated in accordance with a function of the range of the target, means for combining the movements of the second and third members and means actuated by the last named means for controlling the variable speed mechanism that directs the first mechanism at the target.

33. In fire control apparatus wherein there are mechanism representing a target direction line and variable speed mechanism for driving the mechanism in train to direct it at a target in train while there is substantially uniform relative movement between the target and the apparatus, the combination of a member adapted to be positioned in accordance with the angle and speed of the target, an element actuated from the member in accordance with the horizontal lateral deflection of the target, a second element actuated in accordance with a function of the range of the target, means for combining the movements of the elements, a part actuated in accordance with a function of the angle of elevation of the target, means for combining the combined movements of the elements and the movement of the part to refer the combined movements of the elements to a horizontal plane and means actuated by the second combining means for controlling the variable speed mechanism that directs the first mechanism at the target.

34. In a fire control apparatus wherein there are a mechanism representing a target direction line, and variable speed mechanism for driving the mechanism in train to direct it at the target in train while there is substantially uniform relative movement between the target and the apparatus, the combination of a member adapted to be positioned in accordance with the angle and speed of the target, an element actuated from the member in accordance with the horizontal lateral deflection of the target due to its own movement, a second member adapted to be positioned in accordance with the direction and velocity of the wind, a second element actuated from the second member in accordance with the horizontal lateral deflection of the target due to the effect of the wind, means for combining the movements of the elements, a third element actuated in accordance with a function of the range of the target, means for combining the combined movements of the first and second elements and the movement of the third element, a part actuated in accordance with a function of the angle of elevation of the target, means for combining the resultant of the second combining means and the movement of the part to refer the combined movements of the elements to a horizontal plane and means actuated by the third combining means for controlling the variable speed mechanism that directs the first mechanism at the target.

35. In a fire control apparatus wherein there are a mechanism representing a target direction line and variable speed mechanism for driving the mechanism in train to direct it at the target in train while there is substantially uniform relative movement between the target and the apparatus, the combination of a member adapted to be positioned in accordance with the angle and speed of the target, an element actuated from the member in accordance with the horizontal lateral deflection of the target due to its own movement, a second member adapted to be positioned in accordance with the course and speed of the ship on which the apparatus is mounted, a second element actuated from the second member in accordance with the horizontal lateral deflection of the target due to the effect of movement of the ship, means for combining the movements of the elements, a third element actuated in accordance with a function of the range of a target, means for combining the combined movements of the first and second elements and the movement of the third element, a part actuated in accordance with the function of the angle of elevation of the target, means for combining the resultant of the second combining means and the movement of the part to refer the combined movements of the elements to a horizontal plane and means actuated by the third combining means for controlling the variable speed mechanism that directs the first mechanism at the target.

36. In a fire control apparatus wherein there are a mechanism representing a target direction line and variable speed mechanism for driving the mechanism in train to direct it at a target while there is substantially uniform relative movement between the target and the apparatus, the combination of a member adapted to be positioned in accordance with the angle and speed of the target, an element actuated from the member in accordance with the horizontal lateral deflection of the target due to its own movement, a second member adapted to be positioned in accordance with the direction and velocity of the wind, a second element actuated from the second member in accordance with the horizontal lateral deflection of the target due to the effect of the wind, a third member adapted to be positioned in accordance with the course and speed of the ship on which the apparatus is mounted, a third element actuated from the third member in accordance with the horizontal lateral deflection of the target due to the effect of movement of the ship, means for combining the movements of the three elements, a fourth element actuated in accordance with a function of the range of the target, means for combining the combined movements of the first three elements and the movement of the fourth element, a part actuated in accordance with a function of the angle of elevation of the target, means for combining the resultant of the second combining means and the movement of the part to refer the combined movements of the elements to a horizontal plane and means actuated by the third combining means for controlling the variable speed mechanism that directs the first mechanism at the target.

37. In a fire control apparatus wherein there are a mechanism representing a target direction line and variable speed mechanism for driving the mechanism in elevation to direct it at a target while there is substantially uniform relative movement between the target and the apparatus, the combination of a member adapted to be positioned in accordance with the angle and speed of the target, an element actuated from the member in accordance with the horizontal range rate of the target, a second element actuated in accordance with the elevation angle of the target, a third element actuated in accordance with the rate of a climb of the target, means for combining the movements of the elements, a part positioned by the combining means, a second member actuated by the part in accordance with the component of the movement of the target across the line to the target in a vertical plane, a third member actuated in accordance with a function of the range of the target, means for combining the movements of the second and third members, and means actuated by the last named means for controlling the variable speed mechanism that directs the first mechanism at the target.

38. In a fire control apparatus wherein there are a mechanism representing a target direction line and variable speed mechanism for driving the mechanism in elevation to direct it at a target while there is substantially uniform relative movement between the target and the apparatus, the combination of a member adapted to be positioned in accordance with the angle and speed of the target, an element actuated from the member in accordance with the horizontal range rate of the target, a second member adapted to be positioned in accordance with the direction and velocity of the wind, a second element actuated from the second member in accordance with the horizontal range rate of the target due to the effect of the wind, means for combining the movements of the elements, a third element actuated in accordance with the elevation angle of the target, a fourth element actuated in accordance with the rate of climb of the target, means for combining the combined movements of the first and second elements and the movements of the third and fourth elements, a part positioned by the second combining means, a third member actuated by the part in accordance with the component of the movement of the target across the line to the target in a vertical plane, a fourth member actuated in accordance with a function of the range of the target, means for combining the movements of the third and fourth members and means actuated by the last named means for controlling the variable speed mechanism that directs the first mechanism at the target.

39. In a fire control apparatus wherein there are a mechanism representing a target direction line and variable speed mechanism for driving the mechanism in elevation to direct it at a target while there is substantially uniform relative movement between the target and the apparatus, the combination of a member adapted to be positioned in accordance with the angle and speed of the target, an element actuated from the member in accordance with the horizontal range rate of the target, a second member adapted to be positioned in accordance with the course and speed of the ship on which the apparatus is mounted, a second element actuated from the second member in accordance with the horizontal range rate of the target due to movement of the ship, means for combining the movements of the elements, a third element actuated in accordance with the elevation angle of the target, a fourth element actuated in accordance with the rate of climb of the target, means for combining the combined movements of the first and second elements and the movements of the third and fourth elements, a part positioned by the second combining means, a third member actuated by the part in accordance with the component of the movement of the target across the line to the target in a vertical plane, a fourth member actuated in accordance with a function of the range of the target, means for combining the movements of the third and fourth members and means actuated by the last named means for controlling the variable speed mechanism that directs the first mechanism at the target.

40. In a fire control apparatus wherein there are a mechanism representing a target direction line and variable speed mechanism for driving the mechanism in elevation to direct it at a target while there is substantially uniform relative movement between the target and the apparatus, the combination of a member adapted to be positioned in accordance with the angle and speed of the target, an element actuated from the member in accordance with the horizontal range rate of the target, a second member adapted to be positioned in accordance with the direction and velocity of the wind, a second element actuated from the second member in accordance with the horizontal range rate of the target due to the effect of the wind, a third member adapted to be positioned in accordance with the course and speed of the ship on which the apparatus is mounted, a third element actuated from the third member in accordance with the horizontal range rate of the target due to movement of the ship, means for combining the movements of the three elements, a fourth element actuated in accordance with the elevation angle of the target, a fifth element actuated in accordance with the rate of climb of the target, means for combining the combined movements of the first, second and third elements and the movements of the fourth and fifth elements, a part positioned by the second combining means, a fourth member actuated by the part in accordance with the component of the movement of the target across the line to the target in a vertical plane, a fifth member actuated in accordance with a function of the range of the target, means for combining the movements of the fourth and fifth members and means actuated by the last named means for controlling the variable speed mechanism that directs the first mechanism at the target.

41. In fire control apparatus, the combination of a member displaceable in accordance with the horizontal range rate of a target, a motor, a controlling device for the motor actuated by the member, an element actuated by the motor, an element movable in accordance with the elevation angle of the target, an element movable in accordance with the rate of climb of the target, a member actuated from the elements in accordance with the rate of change of direct range, a range element, a variable speed device for driving the range element and operating connections between the member actuated in accordance with the rate of change of direct range and the variable speed device for adjusting the latter to regulate the speed at which the range element is driven.

42. In a fire control apparatus, the combination of a range element, variable speed mechanism for driving the element, a member adapted to be positioned in accordance with the angle and speed of the target, a second element actuated from the member in accordance with the horizontal range rate of the target, a third element actuated in accordance with the elevation angle of the target, a fourth element actuated in accordance with the rate of climb of the target, means for combining the movements of the elements, a part positioned by the combining means, a second member actuated by the part in accordance with the rate of change of direct range and means actuated by the second member for controlling the variable speed mechanism.

43. In a fire control apparatus, the combination of a range element, variable speed mechanism for driving the element, a member adapted to be positioned in accordance with the angle and speed of the target, an element actuated from the member in accordance with the horizontal range rate of the target, a second member adapted to be positioned in accordance with the direction and velocity of the wind, a second element actuated from the second member in accordance with the horizontal range rate of the target due to the effect of the wind, means for combining the movements of the elements, a third element actuated in accordance with the elevation angle of the target, a fourth element actuated in accordance with the rate of climb of the target, means for combining the combined movements of the first and second elements and the movements of the third and fourth elements, a part positioned by the second combining means, a third member actuated by the part in accordance with the rate of change of direct range and means actuated by the third member for controlling the variable speed mechanism.

44. In a fire control apparatus, the combination of a range element, variable speed mechanism for driving the element, a member adapted to be positioned in accordance with the angle and speed of the target, an element actuated from the member in accordance with the horizontal range rate of the target, a second member adapted to be positioned in accordance with the course and speed of the ship on which the apparatus is mounted, a second element actuated from the second member in accordance with the horizontal range rate of the target due to the effect of movement of the ship, means for combining the movements of the elements, a third element actuated in accordance with the elevation angle of the target, a fourth element in accordance with the rate of climb of the target, means for combining the combined movements of the first and second elements and the movements of the third and fourth elements, a part positioned by the second combining means, a third member actuated by the part in accordance with the rate of change of direct range and means actuated by the third member for controlling the variable speed mechanism.

45. In a fire control apparatus, the combination of a range element, variable speed mechanism for driving the element, a member adapted to be positioned in accordance with the angle and speed of the target, an element actuated from the member in accordance with the horizontal range rate of the target, a second member adapted to be positioned in accordance with the direction and velocity of the wind, a second element actuated from the second member in accordance with the horizontal range rate of the target due to the effect of the wind, a third member adapted to be positioned in accordance with the course and speed of the ship on which the apparatus is mounted, a third element actuated from the third member in accordance with the horizontal range rate of the target due to the effect of movement of the ship, means for combining the movements of the three elements, a fourth element actuated in accordance with the elevation angle of the target, a fifth element actuated in accordance with the rate of climb of the target, means for combining the combined movements of the first, second and third elements and the movements of the fourth and fifth elements, a part positioned by the combined movements of the second combining means, a fourth member actuated by the part in accordance with the rate of change of direct range and means actuated by the fourth member for controlling the variable speed mechanism.

46. In a fire control apparatus wherein there are a mechanism representing a target direction line and variable speed mechanism for driving the mechanism in train to direct it at a target while there is substantially uniform relative movement between the target and the apparatus, the combination of an element adapted to be actuated in accordance with the relative bearing of the target, a second element adapted to be actuated in accordance with the course of the ship on which the apparatus is mounted, means jointly actuated by the elements in accordance with the true bearing of the target, a third element adapted to be actuated in accordance with the course of the target, means jointly actuated by the first named means and the third element in accordance with the angle of the target, a fourth element adapted to be actuated in accordance with the speed of the target, means jointly actuated by the second named means and the fourth element in accordance with the horizontal lateral deflection of the target, a fifth element adapted to be actuated in accordance with a function of the range of the target, means jointly actuated by the third named means and the fifth element in accordance with the angular rate of the target in the plane of the line of sight to the target, a part actuated in accordance with a function of the angle of elevation of the target, means operable from the part for referring the angular rate of the target in the plane of the line of sight to a horizontal plane and means actuated by the last named means for controlling the variable speed mechanism that directs the first mechanism at the target.

47. In a fire control apparatus wherein there are a mechanism representing a target direction line and variable speed mechanism for driving the mechanism in elevation to direct it at a target while there is substantially uniform relative movement between the target and the apparatus, the combination of an element adapted to be actuated in accordance with the relative bearing of the target, a second element adapted to be actuated in accordance with the course of the ship on which the apparatus is mounted, means jointly actuated by the elements in accordance with the true bearing of the target, a third element adapted to be actuated in accordance with the course of the target, means jointly actuated by the first named means and the third element in accordance with the angle of the target, a fourth element adapted to be actuated in accordance with the speed of the target, means jointly actuated by the second named means and the fourth element in accordance with the horizontal range rate of the target, a fifth element actuated in accordance with the elevation angle of the target, a sixth element actuated in accordance with the rate of climb of the target, means jointly actuated by the fourth named means and the fifth and sixth elements in accordance with the component of the movement of the target across the line of sight in a vertical plane, a seventh element actuated in accordance with a function of the range of the target, means jointly actuated by the fifth named means and the seventh element in accordance with the rate of change of the elevation angle of the target and means actuated by the last named means for controlling the variable speed mechanism that directs the first mechanism at the target.

48. In fire control apparatus wherein there are mechanism representing a target direction line and means for manually driving the mechanism, the combination of means for automatically driving the mechanism, a member displaceable in accordance with a component of the movement of the target, a motor, a controlling device for the motor actuated by the member, a second member driven by the motor in accordance with the component of the movement of the target, mechanism actuated by the second member and including elements operable in accordance with functions of the position of the target for controlling the means for automatically moving the first mechanism, a second controlling device for the motor under the control of the means for manually moving the first mechanism and means for transferring control of the motor from the first controlling device to the second controlling device whereby correctional displacements of the second member and the mechanism actuated thereby may be produced by the means for manually moving the first mechanism to affect the means for automatically moving the first mechanism.

49. In fire control apparatus wherein there is mechanism representing a target direction line, the combination of means for manually training the mechanism, means for automatically training the mechanism, a member displaceable in accordance with the relative horizontal lateral deflection of the target, a motor, a controlling device for the motor actuated by the member, a second member driven by the motor in accordance with the relative horizontal lateral deflection of the target, mechanism actuated by the second member and including elements operable in accordance with functions of the position of the target for controlling the means for automatically training the first mechanism, a second controlling device for the motor under the control of the means for manually training the first mechanism and means for transferring the control of the motor from the first controlling device to the second controlling device whereby correctional displacements of the second member and the mechanism actuated thereby may be produced by the means for manually moving the first mechanism to affect the means for automatically moving the first mechanism.

50. In fire control apparatus wherein there is mechanism representing a target direction line, the combination of means for manually elevating thhe mechanism, means for automatically elevating the mechanism, a member displaceable in accordance with the horizontal range rate of the target, a motor, a controlling device for the motor actuated by the member, a second member driven by the motor in accordance with the horizontal range rate of the target, mechanism actuated by the second member and including elements operable in accordance with functions of the position of the target for controlling the means for automatically elevating the first mechanism, a second controlling device for the motor under the control of the means for manually elevating the first mechanism and means for transferring the control of the motor from the first controlling device to the second controlling device whereby correctional displacements of the second member and the mechanism controlled thereby may be produced by the means for manually moving the first mechanism to affect the means for automatically moving the first mechanism.

51. In fire control apparatus, the combination of a range element, means for manually moving the range element, means for automatically moving the range element, a member displaceable in accordance with the horizontal range rate of a target, a motor, a controlling device for the motor actuated by the member, a second member driven by the motor in accordance with the horizontal range rate of the target, mechanism actuated by the second member including elements operable in accordance with functions of the position of the target for controlling the means for automatically moving the range element, a second controlling device for the motor under the control of the means for manually moving the range element and means for transferring the control of the motor from the first controlling device to the second controlling device whereby correctional displacements of the second member and the mechanism controlled thereby may be produced by the means for manually moving the range element to affect the means for automatically moving the range element.

52. In fire control apparatus wherein there is a mechanism representing a target direction line, the combination of means for manually driving the mechanism, means for automatically driving the mechanism, a member adapted to be positioned in accordance with the movement of the target, a motor, means for connecting the motor to the member, a second member actuated from the first member in accordance with a component of the movement of the target, a second motor, a controlling device for the second motor actuated by the second member, a third member driven by the second motor in accordance with the component of the movement of the target, mechanism actuated by the third member and including elements operable in accordance with functions of the position of the target for controlling the means for automatically moving the first mechanism, a second controlling device for the second motor under the control of the means for manually moving the first mechanism, means for placing the first motor under the control of the first controlling device and for transferring the control of the second motor from the first controlling device to the second controlling device whereby the first motor repositions the first member when connected thereto and correctional displacements of the third member and the mechanism controlled thereby may be produced by the means for manually moving the first mechanism to affect the means for automatically moving the first mechanism.

53. In fire control apparatus wherein there is mechanism representing a target direction line, the combination of means for manually training the mechanism, means for automatically training the mechanism, a member adapted to be positioned in accordance with the movement of the target, a motor, means for connecting the motor to the member, a second member actuated from the first member in accordance with the relative horizontal lateral deflection of the target, a second motor, a controlling device for the second motor actuated by the second member, a third member driven by the second motor in accordance with the relative horizotal lateral deflection of the target, mechanism actuated by the third member and including elements operable in accordance with functions of the position of the target for controlling the means for automatically training the first mechanism, a second controlling device for the second motor under the control of the means for manually training the first mechanism, means for placing the first motor under the control of the first controlling device and for transferring the control of the second motor from the first controlling device to the second controlling device whereby the first motor repositions the first member when connected thereto and correctional displacements of the third member and the mechanism controlled thereby may be produced by the means for manually training the first mechanism to affect the means for automatically training the first mechanism.

54. In fire control apparatus wherein there is mechanism representing a target direction line, the combination of means for manually elevating the mechanism, means for automatically elevating the mechanism, a member adapted to be positioned in accordance with the movements of the target, a motor, means for connecting the motor to the member, a second member actuated from the first member in accordance with the horizontal range rate of the target, a second motor, a controlling device for the second motor actuated by the second member, a third member driven by the second motor in accordance with the horizontal range rate of the target, mechanism actuated by the third member and including elements operable in accordance with functions of the position of the target for controlling the means for automatically elevating the first mechanism, a second controlling device for the second motor under the control of the means for manually elevating the mechanism, means for placing the first motor under the control of the first controlling device and for transferring the control of the second motor from the first controlling device to the second controlling device whereby the first motor repositions the first member when connected thereto and correctional displacements of the third member and the mechanism controlled thereby may be produced by the means for manually elevating the first mechanism to affect the means for automatically elevating the first mechanism.

55. In fire control apparatus, the combination of a range element, means for manually moving the range element, means for automatically moving the range element, a member adapted to be positioned in accordance with the movement of a target, a motor, means for connecting the motor to the member, a second member actuated from the first member in accordance with the horizontal range rate of the target, a second motor, a controlling device for the second motor actuated by the second member, a third member driven by the second motor in accordance with the horizontal range rate of the target, mechanism actuated by the third member and including elements operable in accordance with functions of the position of the target for controlling the means for automatically moving the range element, a second controlling device for the second motor under the control of the means for manually moving the range element, means for placing the first motor under the control of the first controlling device and for transferring the control of the second motor from the first controlling device to the second controlling device whereby the first motor repositions the first member when connected thereto and correctional displacements of the third member and the mechanism controlled thereby may be produced by the means for manually moving the range element to affect the means for automatically moving the range element.

56. In fire control apparatus wherein there is mechanism representing a target direction line, the combination of means for manually moving the mechanism, means for automatically moving the mechanism, a member adapted to be positioned in accordance with the movement of the target, a pair of motors, means for positioning the member by the cooperation of the pair of motors, a switching device associated with the member, a second member actuated from the first member in accordance with a component of the movement of the target, a third motor, a controlling device for the third motor actuated by the second member, a third member driven by the third motor in accordance with the component of the movement of the target, mechanism actuated by the third member and including elements operable in accordance with functions and the position of the target for controlling the means for automatically moving the first mechanism, a second controlling device for the third motor under the control of the means for manually moving the first mechanism, means for selectively placing through the switching device either of the motors of the pair under the control of the first controlling device according to the position of the switching device whereby the selected motor repositions the first member when connected thereto, said means also functioning to transfer the control of the third motor from the first controlling device to the second controlling device whereby correctional displacements of the third member and the mechanism controlled thereby may be produced by the means for manually moving the first mechanism to affect the means for automatically moving the first mechanism.

57. In fire control apparatus, the combination of a range element, means for manually moving the range element, means for automatically moving the range element, a member adapted to be positioned in accordance with the movement of a target, a pair of motors, means for positioning the members by the cooperation of the pair of motors, a switching device associated with the member, a second member actuated from the first member in accordance with the horizontal range rate of a target, a third motor, a controlling device for the third motor actuated by the second member, a third member driven by the third motor in accordance with the horizontal range rate of the target, mechanism actuated by the third member and including elements operable in accordance with functions of the position of the target for controlling the means for automatically moving the range element, a second controlling device for the third motor under the control of the means for manually moving the range element, means for selectively placing through the switching device either of the motors of the pair under the control of the first controlling device according to the position of the switching device whereby the selected motor repositions the first member when connected thereto, said means also functioning to transfer the control of the third motor from the first controlling device to the second controlling device whereby correctional displacements of the third member and the mechanism controlled thereby may be produced by the means for manually moving the range element to affect the means for automatically moving the range element.

58. In fire control apparatus wherein there is mechanism representing a target direction line, the combination of means for manually moving the mechanism, means for automatically moving the mechanism, a target angle element, a target speed element, a member adapted to be positioned by the elements, a motor, means for connecting the motor to the target angle element, a second motor, means for connecting the second motor to the target speed element, a switching device operatively connected to the target angle element, a second member actuated from the first member in accordance with a component of the movement of the target, a third motor, a controlling device for the third motor actuated by the second member, a third member driven by the third motor in accordance with the component of the movement of the target, mechanism actuated by the third member and including elements operable in accordance with functions of the position of the target for controlling the means for automatically moving the first mechanism, a second controlling device for the third motor under the control of the means for manually moving the first mechanism, means for selectively placing through the switching device the first or second motor under the control of the first controlling device according to the position of the switching device whereby the selected motor repositions the first member when connected thereto, said means also functioning to transfer control of the third motor from the first controlling device to the second controlling device whereby correctional displacements of the third member and the mechanism actuated thereby may be produced by the means for manually moving the first mechanism to affect the means for automatically moving the first mechanism.

59. In fire control apparatus wherein there is mechanism representing a target direction line, the combination of means for manually training the mechanism, means for automatically training the mechanism, a target angle element, a target speed element, a member adapted to be positioned by the elements, a motor, means for connecting the motor to the target angle element, a second motor, means for connecting the second motor to the target speed element, a switching device operatively connected to the target angle element, a second member actuated from the first member in accordance with the relative horizontal lateral deflection of the target, a third motor, a controlling device for the third motor actuated by the second member, a third member driven by the third motor in accordance with the relative horizontal lateral deflection of the target, mechanism actuated by the third member and including elements operable in accordance with functions of the position of the target for controlling the means for automatically moving the first mechanism, a second controlling device for the third motor under the control of the means for manually moving the first mechanism and means for selectively placing through the switching device the first or second motor under the control of the first controlling device according to the position of the switching device whereby the selected motor repositions the first member when connected thereto, said means also functioning to transfer control of the third motor from the first controlling device to the second controlling device whereby correctional displacements of the third member and the mechanism controlled thereby may be produced by the means for manually moving the first mechanism to affect the means for automatically moving the first mechanism.

60. In fire control apparatus wherein there is mechanism representing a target direction line, the combination of means for manually elevating the mechanism, means for automatically elevating the mechanism, a target angle element, a target speed element, a member adapted to be positioned by the elements, a motor, means for connecting the motor to the target angle element, a second motor, means for connecting the second motor to the target speed element, a switching device operatively connected to the target angle element, a second member actuated from the first member in accordance with the horizontal range rate of the target, a third motor, a controlling device for the third motor actuated by the second member, a third member driven by the third motor in accordance with the horizontal range rate of the target, mechanism actuated by the third member and including elements operable in accordance with functions of the position and movement of the target for controlling the means for automatically moving the first mechanism, a second controlling device for the third motor under the control of the means for manually moving the first mechanism and means for selectively placing through the switching device the first or second motor under the control of the first controlling device according to the position of the switch device whereby the selected motor repositions the first member when connected thereto, said means also functioning to transfer control of the third motor from the first controlling device to the second controlling device whereby correctional displacement of the third member and the mechanism controlled thereby may be produced by the means for manually moving the first mechanism to affect the means for automatically moving the first mechanism.

61. In fire control apparatus wherein there is mechanism representing a target direction line, the combination of means for manually moving the mechanism, means for automatically moving the mechanism, a member adapted to be positioned in accordance with factors of the movement of the target, a second member adapted to be positioned in accordance with factors of the wind, a motor, means for selectively connecting the motor to either of the members, a switching device operatively connected to the first member, a second switching device operatively connected to the second member, an element actuated from the first member in accordance with a component of the movement of the target, a second element actuated from the second member in accordance with a component of the wind, means for combining the movements of the elements, a second motor, a controlling device for the second motor actuated by the combining means, a part driven by the second motor in accordance with the movement of the combining means, mechanism actuated by the part and including elements operable in accordance with functions of the position of the target for controlling the means for automatically moving the first mechanism, a second controlling device for the second motor under the control of the means for manually moving the first mechanism, means for connecting the first motor through the first or second switching device to the first controlling device whereby it repositions the first or second member to which it has been selectively connected according to the switching device used, said means also functioning to transfer control of the second motor from the first controlling device to the second controlling device whereby correctional displacements of the part and the mechanism actuated thereby may be produced by the means for manually moving the first mechanism to affect the means for automatically moving the first mechanism.

62. In fire control apparatus wherein there is mechanism representing a target direction line, the combinatoin of means for manually moving the mechanism, means for automatically moving the mechanism, a target angle element, a wind direction element, a motor, means for selectively connecting the motor to the target angle and wind direction elements, a target speed element, a wind velocity element, a second motor, means for selectively connecting the second motor to the target speed and wind velocity elements, a member adapted to be positioned by the target angle and target speed elements, a second member adapted to be positioned by the wind direction and wind velocity elements, a switch device operatively connected to the target angle element, a second switching device operatively connected to the wind direction element, a part actuated from the first member in accordance with a component of the movement of the target, a second part actuated from the second member in accordance with a component of the wind, means for combining the movements of the parts, a third motor, a controlling device for the third motor actuated by the combining means, a third part driven from the third motor in accordance with the resultant of the combining means, mechanism actuated by the third part and including elements operable in accordance with functions of the position of the target for controlling the means for automatically moving the first mechanism, a second controlling device for the third motor under the control of the means for manually moving the first mechanism, means for selectively placing through one or the other of the switching devices the first or second motor under the control of the first controlling device according to the position of the selected switching device whereby the selected motor repositions the member to which it has been connected by the selective connecting means through the elements which position the member, said means also functioning to transfer control of the third motor from the first controlling device to the second controlling device whereby correctional displacements of the third part and the mechanism actuated thereby may be produced by the means for manually moving the first mechanism to affect the means for automatically moving the first mechanism.

63. In fire control apparatus wherein there is mechanism representing a target direction line, the combination means for manually moving the mechanism, means for automatically moving the mechanism, a member displaceable in accordance with a component of the movement of the target, a motor, a controlling device for the motor actuated by the member, a second member driven by the motor in accordance with the component of the movement of the target, mechanism actuated by the second member and including elements operable in accordance with functions of the position of the target for controlling the means for automatically moving the first mechanism, an indicating device actuated by the means for manually moving the first mechanism, a manually operable controlling device for the motor and means for transferring control of the motor from the first controlling device to the manually operable controlling device whereby correctional displacements of the second member and the mechanism actuated thereby may be produced by the manually operable controlling device in accordance with correctional displacements of the means for manually moving the first mechanism as shown by the indicating device to affect the means for automatically moving the first mechanism.

64. In fire control apparatus wherein there is mechanism representing a target direction line, the combination of means for manually training the mechanism, means for automatically training the mechanism, a member displaceable in accordance with the relative horizontal lateral deflection of the target, a motor, a controlling device for the motor actuated by the member, a second member driven by the motor in accordance with the relative horizontal lateral deflection of the target, mechanism actuated by the second member and including elements operable in accordance with functions of the position of the target for controlling the means for automatically training the first mechanism, an indicating device actuated by the means for manually training the first mechanism, a manually operable controlling device for the motor and means for transferring control of the motor from the first controlling device to the manually operable controlling device whereby correctional displacements of the second member and the mechanism actuated thereby may be produced by the manually operable controlling device in accordance with correctional displacements of the means for manually training the first mechanism as shown by the indicating device to affect the means for automatically training the first mechanism.

65. In fire control apparatus wherein there is mechanism representing a target direction line, the combination of means for manually elevating the mechanism, means for automatically elevating the mechanism, a member displaceable in accordance with the horizontal range rate of the target, a motor, a controlling device for the motor actuated by the member, a second member driven by the motor in accordance with the horizontal range rate of the target, mechanism actuated by the second member and including elements operable in accordance with functions of the position and movement of the target for controlling the means for automatically elevating the first mechanism, an indicating device actuated by the means for manually elevating the first mechanism, a manually operable controlling device for the motor and means for transferring control of the motor from the first controlling device to the manually operable controlling device whereby correctional displacements of the second member and the mechanism actuated thereby may be produced by the manually operable controlling device in accordance with correctional displacements of the means for manually elevating the first mechanism as shown by the indicating device to affect the means for automatically elevating the first mechanism.

66. In fire control apparatus, the combination of a range element, means for manually moving the range element, means for automatically moving the range element, a member displaceable in accordance with the horizontal range rate of a target, a motor, a controlling device for the motor actuated by the member, a second member driven by the motor in accordance with the horizontal range rate of the target, mechanism actuated by the second member including elements operable in accordance with functions of the position and movement of the target for controlling the means for automatically moving the range element, an indicating device actuated by the means for manually moving the range element, a manually operable controlling device for the motor and means for transferring control of the motor from the first controlling device to the manually operable controlling device whereby correctional displacements of the second member and the mechanism actuated thereby may be produced by the manually operable controlling device in accordance with correctional displacements of the means for manually moving the range element as shown by the indicating device to affect the means for automatically moving the range element.

67. In fire control apparatus, the combination of directional mechanism, remotely located variable speed mechanism, connections between the mechanisms whereby the directional mechanism may be moved by the variable speed mechanism in elevation and train to follow the movement of a target, means for adjusting the variable speed mechanism in accordance with the estimated rates of movement of the target in elevation and train and means at the directional mechanism and operative upon the adjusting means for applying corrections to the variable speed mechanism when the estimated rates differ from the true rates as manifest by deviation of the directional mechanism from the target.

68. In fire control apparatus, the combination of a sighting device, means including a remotely located variable speed mechanism and connections therefrom to the sighting device for automatically driving it in elevation and train to follow the movement of a target while there is substantially uniform relative movement between the target and the apparatus, means at the sighting device for correcting the first named means in accordance with changes in the relative motion between the sighting device and the target and means at the sighting device for displacing it in accordance with the correction applied to the driving means.

69. In fire control apparatus, the combination of a sighting device including a range finder, means including a remotely located variable speed mechanism and connections therefrom to the sighting device for automatically driving it in elevation and train to follow the movement of a target while there is substantially uniform relative movement between the target and the apparatus, means at the sighting device for correcting the first named means in accordance with changes in the relative motion between the sighting device and the target, means at the sighting device for displacing it in accordance with the correction applied to the driving means, a remotely located range element, means for automatically driving the range element in accordance with the range of the target, means for controlling the range finder in accordance with the range element, means at the range finder for correcting the means for driving the range element in accordance with changes in range and means for displacing the range element in accordance with corrections applied to its driving means.

70. In fire control apparatus wherein there is mechanism representing a target direction line, the combination of remotely located variable speed mechanism, connections between the mechanisms, an element in proximity to the variable speed mechanism and adapted to be positioned in accordance with the angle and speed of the target, a member actuated from the element in accordance with a component of the movement of the target and mechanism actuated by the member and including parts movable in accordance with functions of the position of the target for controlling the variable speed mechanism whereby the first mechanism may be directed in elevation and train at the target while there is substantially uniform relative movement between the target and the apparatus through the connections between it and the variable speed mechanism.

71. In fire control apparatus wherein there are a plurality of mechanisms each representing a target direction line, the combination of variable speed mechanism remotely located with respect to each of the mechanisms, connections between the variable speed mechanism and each of the other mechanisms, a member displaceable in accordance with a component of the movement of the target and mechanism actuated by the member and including parts movable in accordance with functions of the position of the target for controlling the variable speed mechanism whereby the first mechanisms may be directed in elevation and train at the target while there is substantially uniform relative movement between the target and the apparatus through the connections between them and the variable speed mechanism.

72. In fire control apparatus wherein there are a plurality of mechanisms each representing a target direction line, the combination of variable speed mechanism remotely located with respect to each of the mechanisms, connections between the variable speed mechanism and each of the other mechanisms, a member displaceable in accordance with a component of the movement of the target, mechanism actuated by the member and including parts movable in accordance with functions of the position of the target for controlling the variable speed mechanism whereby the first mechanisms may be directed in elevation and train at the target while there is substantially uniform relative movement between the target and the apparatus through the connections between them and the variable speed mechanism, means at each of the first mechanisms for applying correctional adjustments to the remotely located variable speed mechanism to more accurately direct the mechanism at the target and means for selectively connecting the correctional means to the variable speed mechanism according to the mechanism in control.

73. In fire control apparatus, the combination of mechanism representing a target direction line, means for manually moving the mechanism, remotely located variable speed mechanism, connections between the mechanisms, a member displaceable in accordance with a component of the movement of the target, a motor, a controlling device for the motor actuated by the member, a second member driven by the motor in accordance with the component of the movement of the target, mechanism actuated by the second member and including elements operable in accordance with functions of the position of the target for controlling the variable speed mechanism, a second controlling device for the motor, connections between the means for manually moving the first mechanism and the second controlling device and means for transferring control of the motor from the first controlling device to the second controlling device whereby correctional displacements of the second member and the mechanism actuated thereby may be produced by the means for manually moving the first mechanism to affect the variable speed mechanism and through the connections to the first mechanism cause the latter to be maintained on the target direction line.

74. In fire control apparatus, the combination of a sighting device including trainer's and pointer's elements and a range finder, means for automatically driving the sighting device to maintain the elements and range finder on a target, a range element, a variable speed device for driving the range element in accordance with the estimated rate of change of range of the target, means operable from the variable speed device for automatically adjusting the optical elements of the range finder, means under control of the operator of the range finder for adjusting the variable speed device in accordance with lack of coincident of the images to correct for errors in the estimated rate of change of range and means under the control of the operator of the range finder for maintaining the elements of the apparatus in adjusted condition.

75. In fire control apparatus, the combination of a sighting device including trainer's and pointer's elements and a range finder, means for automatically driving the sighting device to maintain the elements and range finder on a target, a range element, a variable speed device for driving the range element in accordance with the estimated rate of change of range of the target, means operable from the variable speed device for automatically adjusting the optical elements of the range finder, means under the control of the operator of the range finder for adjusting the variable speed device in accordance with lack of coincident of the images to correct for errors in the estimated rate of change of range, means under the control of the operator of the range finder for maintaining the elements of the apparatus in adjusted condition and means under the control of the operator of the range finder for manually adjusting the optical elements of the range finder independently of the automatic adjusting means.

76. In fire control apparatus wherein there are a plurality of mechanisms each representing a target direction line and variable speed mechanism remotely located with respect to the mechanisms, there being connections between the variable speed mechanism and each of the other mechanisms, the combination of a member displaceable in accordance with a component of the movement of the target and mechanism actuated by the member and including parts movable in accordance with functions of the position of the target for controlling the variable speed mechanism whereby the first mechanisms may be directed at the target through the connections between them and the variable speed mechanism.

77. In fire control apparatus, the combination of a plurality of mechanisms each representing a target direction line, variable speed mechanism remotely located with respect to the mechanisms, connections between the variable speed mechanism and each of the other mechanisms, a member displaceable in accordance with a component of the movement of the target, mechanism actuated by the member and including parts movable in accordance with functions of the position of the target for controlling the variable speed mechanism whereby the first mechanisms may be directed at the target through the connections between them and the variable speed mechanism, means at each of the first mechanisms for applying correctional adjustments to the remotely located variable speed mechanism to more accurately direct the mechanisms at the target and means for selectively connecting the correctional means to the variable speed mechanism according to the mechanism in control.

78. In fire control apparatus, the combination of a vector adjustable in angular position and length, means for automatically adjusting the angular position and length of the vector, a controlling device for the means operable in accordance with the angular position of the vector, means operable when the length of the vector is reduced to a predetermined value to cause an adjustment of the angular position of the vector which through the controlling device causes the length of the vector to increase.

79. In fire control apparatus, the combination of a vector element adapted to be rotated in accordance with the course of a target and having a part displaceable in accordance with the speed of the target, a motor for rotating the element, a second motor for controllably positioning the part, a controlling device for the motors operable by rotation of the element and means operable from the part when it reaches a predetermined value to actuate the first motor to rotate the element through substantially 180° to reverse the control through the controlling device to cause the second motor to reverse the movement of the part.

80. In fire control apparatus, the combination of a vector element having a part representing the course of a target and a part representing its speed, a motor for adjusting the course part, a motor for adjusting the speed part, a device for controlling the motors, and actuated by the course part, means operable from the speed part when it passes a predetermined value to cause an operation of the motor for adjusting the course part to turn the course part to substantially the opposite direction so that the actuation of the device therefrom reverses the speed motor.

81. In a gun fire control system, a rate control mechanism comprising a mechanical vector, means for adjusting the vector both as to length and direction in accordance with the speed and course of a target, means operated by the vector to resolve the vector into two right angle components representing lineal components of movement of the target with relation to the line of sight, means for generating angular rates of movement from the said lineal components, means for introducing corrections into those generated values in accordance with observed positions of the target, and means for utilizing the corrections thus introduced to modify the vector factors.

82. In a computing mechanism containing a vector and members representing components of said vector, means for setting the members at desired values, means for automatically adjusting the vector to agree therewith, means to apply correction factor, and means responsive thereto to control the setting of said members.

HANNIBAL C. FORD.

References Cited in the file of this patent

UNITED STATES PATENTS

| Number | Name | Date |
|---|---|---|
| Re. 16,734 | Schneider | Sept. 6, 1927 |
| 635,373 | Downes et al. | Oct. 24, 1899 |
| 1,345,697 | Routin | July 6, 1920 |
| 1,370,204 | Ford | Mar. 1, 1921 |
| 1,428,542 | Freret | Sept. 12, 1922 |
| 1,493,095 | Barr et al. | May 6, 1924 |
| 1,497,512 | Kaminski | June 10, 1924 |
| 1,519,015 | Barr et al. | Dec. 9, 1924 |
| 1,646,797 | Swanson | Oct. 25, 1927 |
| 1,751,649 | Nieman | Mar. 25, 1930 |
| 1,831,595 | Gray | Nov. 10, 1931 |
| 1,859,725 | Van Den Bergh | May 24, 1932 |

FOREIGN PATENTS

| Number | Country | Date |
|---|---|---|
| 123,279 | Great Britain | Feb. 20, 1919 |
| 164,765 | Great Britain | June 23, 1921 |
| 236,250 | Great Britain | July 3, 1925 |
| 255,446 | Great Britain | Aug. 25, 1927 |